(12) United States Patent
Niebling et al.

(10) Patent No.: US 8,168,110 B2
(45) Date of Patent: May 1, 2012

(54) METHOD FOR PRODUCING A DEEP-DRAWN FILM PART FROM A THERMOPLASTIC MATERIAL

(75) Inventors: Curt Niebling, Penzberg (DE); Klaus Meyer, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/680,360

(22) PCT Filed: Sep. 26, 2008

(86) PCT No.: PCT/EP2008/008182
§ 371 (c)(1),
(2), (4) Date: Mar. 26, 2010

(87) PCT Pub. No.: WO2009/043539
PCT Pub. Date: Apr. 9, 2009

(65) Prior Publication Data
US 2010/0237544 A1 Sep. 23, 2010

(30) Foreign Application Priority Data

Sep. 28, 2007 (DE) .......................... 10 2007 046 472

(51) Int. Cl.
*B29C 51/00* (2006.01)
(52) U.S. Cl. ......... 264/322; 264/544; 264/320; 264/319
(58) Field of Classification Search .................. None
See application file for complete search history.

(56) References Cited

U.S. PATENT DOCUMENTS 3,342,915 A * 9/1967 Wanderer ...................... 264/522
(Continued)

FOREIGN PATENT DOCUMENTS

CA 2066937 C 2/1999
(Continued)

*Primary Examiner* — Monica A Huson
(74) *Attorney, Agent, or Firm* — Connolly Bove Lodge & Hutz LLP

(57) ABSTRACT

Process for the production of an at least partly printed, metallized and/or otherwise coated thermoformed film part with at least the following process steps:
  a flat film piece which is at least partly printed, metallized and/or otherwise coated on one or on both surface(s) and is made of at least one thermoplastic, and which includes at least one film section which corresponds to the thermoformed part to be produced with respect to size and printing, metallizing and/or coating is provided;
  this film piece is mounted in a defined arrangement on a frame, only the edge sections of the film piece lying on the frame;
  the film piece lying on the frame in this way is introduced into a heating zone, and at least the film section is heated there to a given temperature; and
  the film piece heated in this way is introduced rapidly into a forming zone and is charged there immediately and directly with a fluid pressure means under a pressure means pressure of greater than 20 bar and is formed isostatically to give the desired thermoformed part within a period of time of less than 5 sec.
characterized in that
such a heating is carried out so that at least one side of the entire film section or of the predominant part of the film section has a film surface temperature in the range of from 10 to 65° C. above the Vicat softening temperature B/50.

16 Claims, 3 Drawing Sheets

U.S. PATENT DOCUMENTS

Figure 1:
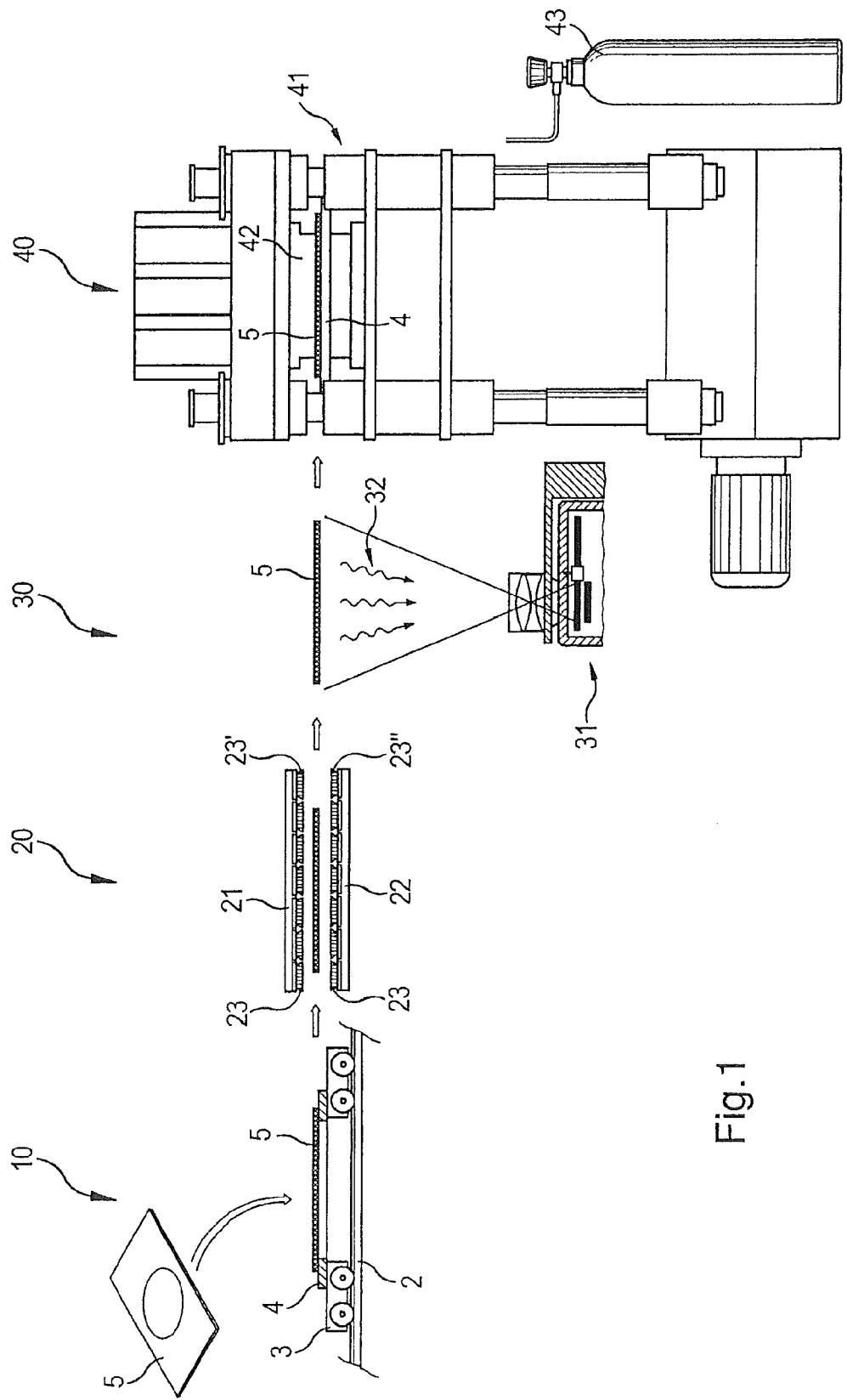

| | | | |
|---|---|---|---|
| 3,462,249 A | 8/1969 | Tunkel | |
| 3,692,744 A | 9/1972 | Rich et al. | |
| 3,896,207 A * | 7/1975 | Cospen et al. | 264/322 |
| 4,034,054 A * | 7/1977 | Sauer | 264/313 |
| 4,758,145 A * | 7/1988 | Hautemont | 425/143 |
| 5,108,530 A | 4/1992 | Niebling, Jr. et al. | |
| 5,217,563 A * | 6/1993 | Niebling et al. | 156/382 |
| 5,275,866 A * | 1/1994 | Leca et al. | 428/174 |
| 6,257,866 B1 | 7/2001 | Fritz et al. | |
| 6,506,334 B1 | 1/2003 | Ellison et al. | |
| 7,662,471 B2 | 2/2010 | Pudleiner et al. | |
| 2004/0183229 A1 | 9/2004 | Kunzel et al. | |
| 2004/0236019 A1 | 11/2004 | Numrich et al. | |
| 2006/0078745 A1 | 4/2006 | Pudleiner et al. | |
| 2008/0020210 A1 | 1/2008 | Griffin et al. | |

FOREIGN PATENT DOCUMENTS

| | | |
|---|---|---|
| DE | 1900270 A1 | 11/1969 |
| DE | 3832396 A1 | 2/1990 |
| DE | 4113568 C1 | 5/1992 |
| DE | 19832570 A1 | 2/2000 |
| DE | 10151281 A1 | 3/2003 |
| DE | 10312610 A1 | 9/2004 |
| EP | 0371425 B1 | 3/1995 |
| EP | 1023150 B1 | 2/2006 |
| EP | 1647399 A2 | 4/2006 |
| FR | 1561581 A | 3/1969 |
| JP | 2003-200486 A | 7/2003 |
| JP | 2006130774 A | 5/2006 |
| WO | WO-2007/045380 A1 | 4/2007 |

* cited by examiner

METHOD FOR PRODUCING A DEEP-DRAWN FILM PART FROM A THERMOPLASTIC MATERIAL

RELATED APPLICATIONS

This application is a national stage application (under 35 U.S.C. §371) of PCT/EP2008/008182, filed Sep. 26, 2008, which claims benefit of German Application No. 10 2007 046 472.1, filed Sep. 28, 2007.

The present invention relates to a process for the production of an at least partly printed, metallized and/or otherwise coated thermoformed film part of at least one thermoplastic, preferably of polycarbonate (PC) or of polymethyl methacrylate or poly(meth)acrylate (PMMA).

Depending on their use, the thermoformed film parts or thermoformed parts obtainable according to the invention typically have a graphic, functional and/or decorative design which follows a given layout and sections of different colour, optionally with additionally one or more transparent section(s). These thermoformed parts can be employed, for example, as lamp covers, as illuminated signs, as housing parts, as illuminable push or switch buttons, as display devices, as scale, fittings and/or instrument display panels, and as dials and signal displays of the most diverse nature. One important field of use relates to the display panels or display elements of the instruments, scales and displays on the dashboard of motor vehicles; here, for example, the display panel of the driving speed display instrument or tachometer; these tachometer display panels are also call "tacho screens" among persons skilled in the art. Without a limitation of the present invention thereby being intended, the process according to the invention is explained below with the aid of the production of such tacho screens.

The basic process for forming a sheet or film of plastic to give a usually relatively simply formed shaped article is thermoforming. In this, the flat starting material is heated to such a high shaping temperature that it becomes soft and plastic, and in this state can be moulded on to the contour of a mould under the action of relatively low shaping forces. These shaping forces can be applied, for example, by application of a vacuum (vacuum process), by charging with a fluid pressure means under a pressure means pressure of up to about 4 to 6 bar (compressed air process) or by a combination of both measures. For PMMA films, in this case Plexiglas®XT (from RÖHM GMBH), a shaping temperature of from 160 to 170° C. is stated by the manufacturer. For thermoforming of PC films, in this case Makrofol® (from BAYER AG), the film must be conditioned beforehand in a heating oven at no less than 80° C. for at least 8 h in order to remove solvent residues. The conditioned film is then heated to a shaping temperature above 220° C., for example is kept for 15 to 20 sec between a top heating with a radiator surface temperature of 600° C. and a bottom heating with a radiator surface temperature of 400° C. Without prior conditioning, the solvent residues would cause blistering during the heating to the shaping temperature and during the subsequent thermoforming. Because only relative low shaping forces are used during thermoforming, the material for forming must be very soft and plastic. Relatively simply formed shaped articles, such as housing and containers, are typically obtained in this way. A precise reproduction of a graphic design and/or a true and accurate casting of sharp-edged structures of the flat starting film in each case on the finished shaped article is not possible.

In contrast, the present invention relates to a process for the production of an at least partly printed, metallized and/or otherwise coated thermoformed film part with at least the following process steps:
a flat film piece which is at least partly printed or metallized and/or otherwise coated on one or on both surface(s) and is made of at least one thermoplastic, in particularly preferred embodiments of polycarbonate (PC) or of polymethyl methacrylate or poly(meth)acrylate (PMMA), and which includes at least one film section which corresponds to the thermoformed part to be produced with respect to size and printing, metallizing and/or coating is provided;
this film piece is mounted in a defined arrangement on a frame, only the edge sections of the film piece lying on the frame;
the film piece held on the frame in this way is introduced into a heating zone, and at least the film section is heated there to a given temperature; and
the film piece heated in this way is then introduced rapidly into a forming zone and is charged there immediately and directly with a fluid pressure means under a pressure means pressure of greater than 20 bar and is formed isostatically to give the desired thermoformed part within a period of time of less than 5 sec.

A similar process of this type is known from the document EP 0 371 425 B1; among persons skilled in the art this process is also called "high pressure forming or high pressure shaping" of films of plastic or as the "very high pressure process" or as "cold forming of films by high pressure forming" or the HPF process (from high pressure forming). By this process, for example, a transparent PC film having a layer thickness of 125 μm (Makrofol®, obtained from BAYER AG) and having a softening temperature of about 150° C. is heated to a working temperature in the range of from 90 to 120° C. and then formed with the aid of compressed air of 150 bar. This working temperature relates to the entire film.

The document DE 41 13 568 C1 describes a device for high pressure forming of films of plastic by this HPF process. Such an automatically operating device comprises at least:
a continuous line of movable, frame-like pallets which are guided by a conveyor stepwise through the various work stations of the device;
a feed station in which in each case a flat film piece to be formed is arranged in a defined arrangement on in each case one pallet;
a heating station in which each film piece is heated to a given temperature;
a shaping station with a mould, on to the mould cavity of which the film piece is moulded;
a removal station, in which the thermoformed film piece formed in the shaping station is detached from the pallet holding this and enters into a collecting container; and
a source for a fluid pressure means kept under increased pressure, in particular compressed air, with which the film piece arranged in the mould is charged and formed.

A heating station described there in detail comprises three heating fields which are aligned side by side in a common plane and are arranged at a distance above the moving track of the line of pallets. Each heating field has a number of infrared surface heaters, some of which can be activated independently. Preferably, the infrared surface heaters at the edge can be activated independently. A pilot heater is equipped with sensors for recording the ambient temperature and its surface temperature. The surface temperature of the pilot heater can be kept constant within narrow limits. The pilot heater delivers signals for controlling the infrared surface heaters which can be activated independently, in order to keep their heating surface likewise at a given temperature.

During the stepwise feed, the film piece to be heated remains at a distance from these heating fields for a given period of time and is heated to the envisaged working temperature. With the aid of the infrared surface heaters at the edge, which have a higher temperature, it can be ensured that the edge sections of the film piece also assume the same temperature as the central section, so that the entire film piece has a uniform particular given working temperature.

One peculiarity of this known high pressure forming of films of plastic is that the forming is carried out at a working temperature below the softening temperature of the plastic of the particular film material. For example, the polycarbonate material based on bisphenol A used there (Makrolon® from BAYER AG) has a softening temperature of about 150° C.; the high pressure forming is carried out at a working temperature of the entire heated film of about 120° C.

Practical experience shows that certain restoring forces frequently also occur on film parts thermoformed under such conditions. The thermoformed film parts produced in this way are therefore often also injection-moulded on the reverse with further transparent plastic in order to provide dimensionally stable products. These processes are also called insert moulding among persons skilled in the art. For injection moulding on the reverse or insert moulding, the printed and thermoformed film part is laid in an injection mould such that printing is facing the die side, and is injection moulded on the reverse, for example, with a 0.5 to 3.0 mm thick layer of a thermoplastic. For example, a hot runner mould with needle valve gating is particularly suitable. Thermoplastics such as, for example, PC, mixtures of PC with acrylonitrile/butadiene/styrene copolymers (ABS) and PMMA materials are suitable for the injection moulding on the reverse. The molten material used for the injection moulding on the reverse meets the printed film with a temperature of about 220° C. to 300° C. To avoid damage to the decoration here, the film can be provided with a protection element in the region of the injection channels; cf. in this context, for example, DE 103 12 610 A1.

The document EP 1 023 150 B1 relates inter alia to a process for the production of a shaped article. In this process a flat, optionally coloured film which, for example, can be made of PC is arranged over a mould cavity. Molten plastic, for example likewise PC, is arranged on this film. Because the film in contact with the melt of plastic already becomes soft and plastic, a moderate gas pressure can be built up in the mould cavity, which supports the weight of the film and melt of plastic, in order to avoid sagging of the film under the weight of the molten plastic. The combination of film and melt of plastic is then forced into the mould cavity with the aid of a swage or punch, and the film is brought to rest on the mould cavity wall. After cooling, an optionally thin-walled shaped article is obtained, the outer layer of which comprises the optionally coloured film.

According to an alternative process of this type (cf. the document U.S. Pat. No. 6,506,334 B1), the film piece covers the mould cavity in a lower mould. A further piece of plastic which has been cut to fit and has been heated to a particular temperature beforehand, is laid on this film piece. This temperature is conventionally the melting temperature of the plastic from which the piece of plastic is made, or an even higher temperature. The piece of plastic can be heated to this temperature with the aid of infrared heating, convection heating, high frequency heating or with the aid of another heating measure. The double layer arrangement of optionally coloured film and the hot piece of plastic is then pushed into the mould cavity with the aid of a punch or an upper mould. These processes mentioned last are also called compression moulding.

The processes mentioned, such as, for example, insert moulding, compression moulding and further processes of this type, deliver multi-layered, optionally thin-walled shaped articles on which the decorative film forms an outer layer, but the decoration itself is within the shaped article mass and is therefore protected from abrasion. The contact with the molten plastics composition can impair the decoration on the decorative layer.

A high reproduction accuracy of the order of ±0.1 mm typically cannot be obtained with compression moulding, because the entire film is already soft and plastic during the forming. The procedure requiring at least two working steps is involved. However, the relevant industry increasingly demands thermoformed single-layered and dimensionally stable film parts of this type in order thus to avoid the further working step of injection moulding with plastic on the reverse.

On this basis, the object of the present invention is to provide a process of the generic type (cf. EP 0 371 425 B1) with which single-layered thermoformed and dimensionally stable film parts of at least one thermoplastic, in particularly preferred embodiments of polycarbonate (PC) or of polymethyl methacrylate or poly(meth)acrylate (PMMA) which are practically free from internal stresses and restoring forces and which have an unchanged, extremely accurate positioning of the original graphic, functional and/or decorative design of the order of preferably ±0.1 mm after the high pressure forming are obtainable.

Starting from a process for the production of an at least partly printed, metallized and/or otherwise coated thermoformed film part with at least the following process steps:
  a flat film piece which is at least partly printed, metallized and/or otherwise coated on one or on both surface(s) and is made of at least one thermoplastic, and which includes at least one film section which corresponds to the thermoformed part to be produced with respect to size and printing, metallizing and/or coating is provided;
  this film piece is mounted in a defined arrangement on a frame, only the edge sections of the film piece lying on the frame;
  the film piece lying on the frame in this way is introduced into a heating zone, and at least the film section is heated there to a given temperature; and
  the film piece heated in this way is then introduced rapidly into a forming zone and is charged there immediately and directly with a fluid pressure means of greater than 20 bar and is formed isostatically to give the desired thermoformed part within a period of time of less than 5 sec.

the solution according to the invention to the above problem is
characterized in that
such a heating is carried out so that at least one side of the entire film section or of the predominant part of the film section has a film surface temperature in the range of from 10 to 65° C., preferably from 15 to 65° C., particularly preferably from 20 to 65° C., very particularly preferably from 25 to 60° C. above the Vicat softening temperature B/50.

The Vicat softening temperature B/50 of a thermoplastic is the Vicat softening temperature B/50 according to ISO 306 (50 N; 50° C./h).

Preferably, individual film piece segments, preferably individual segments of the film section, can also be heated further to an increased temperature which exceeds this film surface temperature by at least 3° C. and by not more than 10° C., and are formed with this film temperature under the other conditions of the process according to the invention.

Compared with the process according to the prior art, the process according to the invention offers the advantage that thermoformed film parts in which the restoring forces and internal stresses are minimized or which are practically free from internal stresses and restoring forces are obtainable by this process. Furthermore, a high reproduction accuracy of the order of preferably ±0.1 mm can be achieved in the thermoformed film parts produced according to the invention. This is achieved surprisingly by the combination according to the invention of the individual process steps, without the film acquiring plastic flow properties due to the heating to a film surface temperature in the stated range above the Vicat softening temperature B/50 and the reproduction accuracy in the subsequent forming operation being impaired.

According to the invention, either the entire film section or the predominant part of the film section is heated to the corresponding film surface temperature. In the context of the invention here, the predominant part of the film section is to be understood as meaning at least 60%, preferably at least 70%, particularly preferably at least 80%, very particularly preferably at least 90% of the film section which corresponds to the thermoformed part to be produced with respect to size and printing, metallizing and/or coating.

In the context of the present invention, rapid introduction of the film piece into the forming zone is to be understood as meaning that after heating to the particular envisaged film surface temperature, the film piece is transferred into the forming zone within a period of time of less than 10 sec, preferably less than 5 sec, particularly preferably less than 2 sec, very particularly preferably less than 1 sec.

Film pieces in the thickness range of from 100 μm to 2,000 μm, preferably in the thickness range of from 125 to 750 μm, particularly preferably in the thickness range of from 125 to 600 μm and very particularly preferably in the thickness range of from 200 to 500 μm are typically employed in the process according to the invention.

The thermoplastic can preferably be at least one thermoplastic chosen from polymers of ethylenically unsaturated monomers and/or polycondensates of bifunctional reactive compounds and/or polyaddition products of bifunctional reactive compounds, preferably at least one thermoplastic chosen from polymers of ethylenically unsaturated monomers and/or polycondensates of bifunctional reactive compounds. For certain uses it may be advantageous and accordingly preferable to employ a transparent thermoplastic.

Particularly suitable thermoplastics are polycarbonates or copolycarbonates based on diphenols, poly- or copolyacrylates and poly- or copolymethacrylates, such as, by way of example and preferably, polymethyl methacrylate or poly (meth)acrylate (PMMA), poly- or copolymers with styrene, such as, by way of example and preferably, polystyrene or polystyrene/acrylonitrile (SAN), thermoplastic polyurethanes, and polyolefins, such as, by way of example and preferably, polypropylene types or polyolefins based on cyclic olefins (e.g. TOPAS®, Hoechst), poly- or copolycondensates of terephthalic acid, such as, by way of example and preferably, poly- or copolyethylene terephthalate (PET or CoPET), glycol-modified PET (PETG), glycol-modified poly- or copolycyclohexane-dimethylene terephthalate (PCTG) or poly- or copolybutylene terephthalate (PBT or CoPBT) or mixtures of the abovementioned. Needless to say, polyolefins, such as e.g. polypropylene, without addition of other abovementioned thermoplastics are less preferred for the process according to the invention.

Preferred thermoplastics are polycarbonates or copolycarbonates, poly- or copolyacrylates, poly- or copolymethacrylates or blends containing at least one of these thermoplastics. Polycarbonates or copolycarbonates are particularly preferred, in particular having average molecular weights $M_w$ of from 500 to 100,000, preferably from 10,000 to 80,000, particularly preferably from 15,000 to 40,000, or blends thereof with at least one poly- or copolycondensate of terephthalic acid having average molecular weights $M_w$, of from 10,000 to 200,000, preferably from 26,000 to 120,000, or poly- or copolyacrylates and poly- or copolymethacrylates having average molecular weights $M_w$ in the range of from 30,000 to 300,000, particularly preferably in the range of from 80,000 to 250,000.

In preferred embodiments of the invention, suitable poly- or copolycondensates of terephthalic acid are polyalkylene terephthalates. Suitable polyalkylene terephthalates are, for example, reaction products from aromatic dicarboxylic acids or their reactive derivatives (e.g. dimethyl esters or anhydrides) and aliphatic, cycloaliphatic or araliphatic diols and mixtures of these reaction products.

Preferred polyalkylene terephthalates can be prepared from terephthalic acid (or its reactive derivatives) and aliphatic or cycloaliphatic diols having 2 to 10 C atoms by known methods (Kunststoff-Handbuch, vol. VIII, p. 695 et seq., Karl-Hanser-Verlag, Munich 1973).

Preferred polyalkylene terephthalates contain at least 80 mol %, preferably 90 mol % of terephthalic acid radicals, based on the dicarboxylic acid component, and at least 80 mol %, preferably at least 90 mol % of ethylene glycol radicals and/or butane-1,4-diol radicals and/or 1,4-cyclohexanedimethanol radicals, based on the diol component.

The preferred polyalkylene terephthalates can contain, in addition to terephthalic acid radicals, up to 20 mol % of radicals of other aromatic dicarboxylic acids having 8 to 14 C atoms or aliphatic dicarboxylic acids having 4 to 12 C atoms, such as, for example, radicals of phthalic acid, isophthalic acid, naphthalene-2,6-dicarboxylic acid, 4,4'-diphenyldicarboxylic acid, succinic, adipic or sebacic acid, azelaic acid or cyclohexanediacetic acid.

The preferred polyalkylene terephthalates can contain, in addition to ethylene glycol radicals and/or butane-1,4-diol radicals, up to 80 mol % of other aliphatic diols having 3 to 12 C atoms or cycloaliphatic diols having 6 to 21 C atoms, e.g. radicals of propane-1,3-diol, 2-ethylpropane-1,3-diol, neopentyl glycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, hexane-2,5-diol, 1,4-di-([beta]-hydroxyethoxy)-benzene, 2,2-bis-(4-hydroxycyclohexyl)-propane, 2,4-dihydroxy-1,1,3,3-tetramethyl-cyclobutane, 2,2-bis-(3-[beta]-hydroxyethoxyphenyl)-propane and 2,2-bis-(4-hydroxypropoxyphenyl)-propane (cf. DE-OS 24 07 674, 24 07 776, 27 15 932).

The polyalkylene terephthalates can be branched by incorporation of relatively small amounts of 3- or 4-hydric alcohols or 3- or 4-basic carboxylic acids, as described e.g. in DE-OS 19 00 270 and U.S. Pat. No. 3,692,744. Examples of preferred branching agents are trimesic acid, trimellitic acid, trimethylolethane and -propane and pentaerythritol.

Preferably, not more than 1 mol % of the branching agent, based on the acid component, is used.

Polyalkylene terephthalates which have been prepared solely from terephthalic acid and reactive derivatives thereof (e.g. dialkyl esters thereof) and ethylene glycol and/or butane-1,4-diol and/or 1,4-cyclohexanedimethanol radicals and mixtures of these polyalkylene terephthalates are particularly preferred.

Preferred polyalkylene terephthalates are also copolyesters which are prepared from at least two of the abovementioned acid components and/or from at least two of the abovementioned alcohol components, and particularly preferred copolyesters are poly(ethylene glycol/butane-1,4-diol) terephthalates.

The polyalkylene terephthalates preferably used as a component preferably have an intrinsic viscosity of from approx. 0.4 to 1.5 dl/g, preferably 0.5 to 1.3 dl/g, in each case measured in phenol/o-dichlorobenzene (1:1 parts by wt.) at 25° C.

In particularly preferred embodiments of the invention, the blend of at least one polycarbonate or copolycarbonate with at least one poly- or copolycondensate of terephthalic is a blend of at least one polycarbonate or copolycarbonate with poly- or copolybutylene terephthalate or glycol-modified poly- or copolycyclohexanedimethylene terephthalate. Such a blend of polycarbonate or copolycarbonate with poly- or copolybutylene terephthalate or glycol-modified poly- or copolycyclohexanedimethylene terephthalate can preferably be one with 1 to 90 wt. % of polycarbonate or copolycarbonate and 99 to 10 wt. % of poly- or copolybutylene terephthalate or glycol-modified poly- or copolycyclohexanedimethylene terephthalate, preferably with 1 to 90 wt. % of polycarbonate and 99 to 10 wt. % of polybutylene terephthalate or glycol-modified polycyclohexanedimethylene terephthalate, the contents adding up to 100 wt. %. Such a blend of polycarbonate or copolycarbonate with poly- or copolybutylene terephthalate or glycol-modified poly- or copolycyclohexanedimethylene terephthalate can particularly preferably be one with 20 to 85 wt. % of polycarbonate or copolycarbonate and 80 to 15 wt. % of poly- or copolybutylene terephthalate or glycol-modified poly- or copolycyclohexanedimethylene terephthalate, preferably with 20 to 85 wt. % of polycarbonate and 80 to 15 wt. % of polybutylene terephthalate or glycol-modified polycyclohexanedimethylene terephthalate, the contents adding up to 100 wt. %. Such a blend of polycarbonate or copolycarbonate with poly- or copolybutylene terephthalate or glycol-modified poly- or copolycyclohexanedimethylene terephthalate can very particularly preferably be one with 35 to 80 wt. % of polycarbonate or copolycarbonate and 65 to 20 wt. % of poly- or copolybutylene terephthalate or glycol-modified poly- or copolycyclohexanedimethylene terephthalate, preferably with 35 to 80 wt. % of polycarbonate and 65 to 20 wt. % of polybutylene terephthalate or glycol-modified polycyclohexanedimethylene terephthalate, the contents adding up to 100 wt. %. In very particularly preferred embodiments, the blends can be those of polycarbonate and glycol-modified polycyclohexanedimethylene terephthalate in the abovementioned compositions.

In preferred embodiments, suitable polycarbonates or copolycarbonates are, in particular, aromatic polycarbonates or copolycarbonates.

In a known manner, the polycarbonates or copolycarbonates can be linear or branched.

The preparation of these polycarbonates can be carried out in a known manner from diphenols, carbonic acid derivatives, optionally chain terminators and optionally branching agents. Details of the preparation of polycarbonates have been laid down in many patent specifications for about 40 years. By way of example, reference is made merely to Schnell, "Chemistry and Physics of Polycarbonates", Polymer Reviews, volume 9, Interscience Publishers, New York, London, Sydney 1964, to D. Freitag, U. Grigo, P. R. Müller, H. Nouvertne, BAYER AG, "Polycarbonates" in Encyclopedia of Polymer Science and Engineering, volume 11, second edition, 1988, pages 648-718, and finally to Drs. U. Grigo, K. Kirchner and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Suitable diphenols can be, for example, dihydroxyaryl compounds of the general formula (I)

wherein Z is an aromatic radical having 6 to 34 C atoms, which can contain one or more optionally substituted aromatic nuclei and aliphatic or cycloaliphatic radicals or alkylaryls or hetero atoms as bridge members.

Examples of suitable dihydroxyaryl compounds are: dihydroxybenzenes, dihydroxydiphenyls, bis-(hydroxyphenyl)-alkanes, bis-(hydroxyphenyl)-cycloalkanes, bis-(hydroxyphenyl)-aryls, bis-(hydroxyphenyl)ethers, bis-(hydroxyphenyl) ketones, bis-(hydroxyphenyl) sulfides, bis-(hydroxyphenyl) sulfones, bis-(hydroxyphenyl)-sulfoxides, 1',1'-bis-(hydroxyphenyl)-diisopropylbenzenes, and nucleus-alkylated and nucleus-halogenated compounds thereof.

These and further suitable other dihydroxyaryl compounds are described e.g. in DE-A 3 832 396, FR-A 1 561 518, in H. Schnell, Chemistry and Physics of Polycarbonates, Interscience Publishers, New York 1964, p. 28 et seq.; p. 102 et seq., and in D. G. Legrand, J. T. Bendler, Handbook of Polycarbonate Science and Technology, Marcel Dekker New York 2000, p. 72 et seq.

Preferred dihydroxyaryl compounds are, for example, resorcinol, 4,4'-dihydroxydiphenyl, bis-(4-hydroxyphenyl)-methane, bis-(3,5-dimethyl-4-hydroxyphenyl)-methane, bis-(4-hydroxyphenyl)-diphenyl-methane, 1,1-bis-(4-hydroxyphenyl)-1-phenyl-ethane, 1,1-bis-(4-hydroxyphenyl)-1-(1-naphthyl)-ethane, 1,1-bis-(4-hydroxyphenyl)-1-(2-naphthyl)-ethane, 2,2-bis-(4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(4-hydroxyphenyl)-1-phenyl-propane, 2,2-bis-(4-hydroxyphenyl)-hexafluoro-propane, 2,4-bis-(4-hydroxyphenyl)-2-methyl-butane, 2,4-bis-(3,5-dimethyl-4-hydroxyphenyl)-2-methylbutane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-4-methyl-cyclohexane, 1,3-bis-[2-(4-hydroxyphenyl)-2-propyl]-benzene, 1,1'-bis-(4-hydroxyphenyl)-3-diisopropyl-benzene, 1,1'-bis-(4-hydroxyphenyl)-4-diisopropyl-benzene, 1,3-bis-[2-(3,5-dimethyl-4-hydroxyphenyl)-2-propyl]-benzene, bis-(4-hydroxyphenyl)ether, bis-(4-hydroxyphenyl) sulfide, bis-(4-hydroxyphenyl) sulfone, bis-(3,5-dimethyl-4-hydroxyphenyl) sulfone and 2,2',3,3'-tetrahydro-3,3',3'-tetramethyl-1,1'-spirobi-[1H-indene]-5, 5'-diol or dihydroxydiphenylcycloalkanes of the formula (Ia)

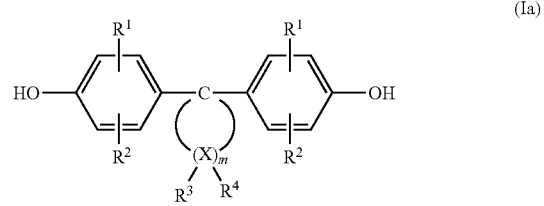

wherein

R$^1$ and R$^2$ independently of one another denote hydrogen, halogen, preferably chlorine or bromine, C$_1$-C$_8$-alkyl, C$_5$-C$_6$-cycloalkyl, C$_6$-C$_{10}$-aryl, preferably phenyl, and C$_7$-C$_{12}$-aralkyl, preferably phenyl-C$_1$-C$_4$-alkyl, in particular benzyl, m denotes an integer from 4 to 7, preferably 4 or 5, R$^3$ and R$^4$ can be chosen individually for each X and independently of one another denote hydrogen or C$_1$-C$_6$-alkyl and X denotes carbon, with the proviso that on at least one atom X, R$^3$ and R$^4$ simultaneously denote alkyl. Preferably, in the formula (Ia) R$^3$ and R$^4$ are simultaneously alkyl on one or two atom(s) X, in particular only on one atom X.

The preferred alkyl radical for the radicals R$^3$ and R$^4$ in formula (Ia) is methyl. The X atoms in the alpha position to the diphenyl-substituted C atom (C-1) are preferably not dialkyl-substituted, but in contrast alkyl disubstitution in the beta position to C-1 is preferred.

Particularly preferred dihydroxydiphenylcycloalkanes of the formulae (Ia) are those having 5 and 6 ring C atoms X in the cycloaliphatic radical (m=4 or 5 in formula (Ia)), for example the diphenols of the formulae (Ib) to (Id)

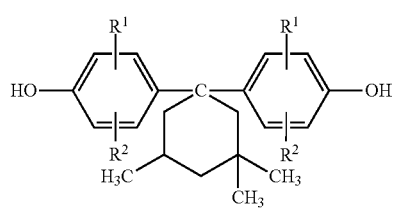
(Ia-1)

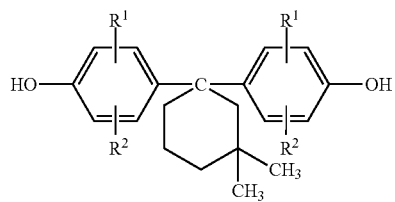
(Ia-2)

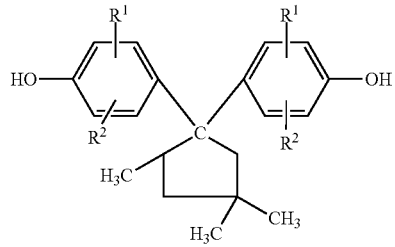
(Ia-3)

A very particularly preferred dihydroxydiphenylcycloalkane of the formula (Ia) is 1,1-bis-(4-hydroxyphenyl)-3,3,5-trimethyl-cyclohexane (formula (Ia-1) where R$^1$ and R$^2$ are H).

Such polycarbonates can be prepared in accordance with EP-A 359 953 from dihydroxydiphenylcycloalkanes of the formula (Ia).

Particularly preferred dihydroxyaryl compounds are resorcinol, 4,4'-dihydroxydiphenyl, bis-(4-hydroxyphenyl)-diphenyl-methane, 1,1-bis-(4-hydroxyphenyl)-1-phenyl-ethane, bis-(4-hydroxyphenyl)-1-(1-naphthyl)-ethane, bis-(4-hydroxyphenyl)-1-(2-naphthyl)-ethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-3,3,5-trimethyl-cyclohexane, 1,1'-bis-(4-hydroxyphenyl)-3-diisopropyl-benzene and 1,1'-bis-(4-hydroxyphenyl)-4-diisopropyl-benzene.

Very particularly preferred dihydroxyaryl compounds are 4,4'-dihydroxydiphenyl, 2,2-bis-(4-hydroxyphenyl)-propane and 1,1-bis-(4-hydroxyphenyl)-3,3,5-trimethyl-cyclohexane.

It is possible to use either one dihydroxyaryl compound to form homopolycarbonates or various dihydroxyaryl compounds to form copolycarbonates.

It is possible to use either one dihydroxyaryl compound of the formula (I) or (Ia) to form homopolycarbonates or several dihydroxyaryl compounds of the formula (I) and/or (Ia) to form copolycarbonates. In this context, the various dihydroxyaryl compounds can be linked to one another either randomly or blockwise. In the case of copolycarbonates from dihydroxyaryl compounds of the formula (I) and (Ia), the molar ratio of dihydroxyaryl compounds of the formula (Ia) to the other dihydroxyaryl compounds of the formula (I) optionally to be co-used is preferably between 99 mol % of (Ia) to 1 mol % of (I) and 2 mol % of (Ia) to 98 mol % of (I), preferably between 99 mol % of (Ia) to 1 mol % of (I) and 10 mol % of (Ia) to 90 mol % of (I) and in particular between 99 mol % of (Ia) to 1 mol % of (I) and 30 mol % of (Ia) to 70 mol % of (I).

A very particularly preferred copolycarbonate can be prepared using 1,1-bis-(4-hydroxyphenyl)-3,3,5-trimethyl-cyclohexane and 2,2-bis-(4-hydroxyphenyl)-propane as dihydroxyaryl compounds of the formula (Ia) and (I).

Poly- or copolycarbonates prepared using dihydroxyaryl compounds of the formula (Ia) conventionally have a higher glass transition temperature T$_g$ and a higher Vicat softening temperature B/50 than poly-polycarbonate based on 2,2-bis-(4-hydroxyphenyl)-propane as the dihydroxyaryl compound.

Suitable carbonic acid derivatives can be, for example, diaryl carbonates of the general formula (II)

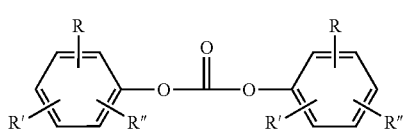
(II)

wherein

R, R' and R" independently of one another are identical or different and represent hydrogen, linear or branched C$_1$-C$_{34}$-alkyl, C$_7$-C$_{34}$-alkylaryl or C$_6$-C$_{34}$-aryl, R furthermore can also denote —COO—R''', wherein R''' represents hydrogen, linear or branched C$_1$-C$_{34}$-alkyl, C$_7$-C$_{34}$-alkylaryl or C$_6$-C$_{34}$-aryl.

Preferred diaryl carbonates are, for example, diphenyl carbonate, methylphenyl phenyl carbonates and di-(methylphenyl) carbonates, 4-ethylphenyl phenyl carbonate, di-(4-ethylphenyl) carbonate, 4-n-propylphenyl phenyl carbonate, di-(4-n-propylphenyl) carbonate, 4-iso-propylphenyl phenyl carbonate, di-(4-iso-propylphenyl) carbonate, 4-n-butylphenyl phenyl carbonate, di-(4-n-butylphenyl) carbonate, 4-iso-butylphenyl phenyl carbonate, di-(4-iso-butylphenyl) carbonate, 4-tert-butylphenyl phenyl carbonate, di-(4-tert-butylphenyl) carbonate, 4-n-pentylphenyl phenyl carbonate, di-(4-n-phenylphenyl) carbonate, 4-n-hexylphenyl phenyl carbonate, di-(4-n-hexylphenyl) carbonate, 4-iso-octylphenyl phenyl carbonate, di-(4-iso-octylphenyl) carbonate, 4-n-nonylphenyl phenyl carbonate, di-(4-n-nonylphenyl) carbonate, 4-cyclohexylphenyl phenyl carbonate, di-(4-cyclohexylphenyl) carbonate, 4-(1-methyl-1-phenylethyl)-phenyl phenyl carbonate, di-[4-(1-methyl-1-phenylethyl)-phenyl]carbonate, biphenyl-4-yl phenyl carbonate, di(biphenyl-4-yl) carbonate, 4-(1-naphthyl)-phenyl phenyl carbonate, 4-(2-naphthyl)-phenyl phenyl carbonate, di-[4-(1-naphthyl)-phenyl]carbonate, di-[4-(2-naphthyl)-phenyl]carbonate, 4-phenoxyphenyl phenyl carbonate, di-(4-phenoxyphenyl) carbonate, 3-pentadecylphenyl phenyl carbonate, di-(3-pentadecylphenyl) carbonate, 4-tritylphenyl phenyl carbonate, di-(4-tritylphenyl) carbonate, methyl-salicylate phenyl carbonate, di-(methyl-salicylate) carbonate, ethyl-salicylate phenyl carbonate, di-(ethyl-salicylate) carbonate, n-propyl-salicylate phenyl carbonate, di-(n-propyl-salicylate) carbonate, iso-propyl-salicylate phenyl carbonate, di-(iso-propyl-salicylate) carbonate, n-butyl-salicylate phenyl carbonate, di-(n-butyl-salicylate) carbonate, iso-butyl-salicylate phenyl carbonate, di-(iso-butyl-salicylate) carbonate, tert-butyl-salicylate phenyl carbonate, di-(tert-butyl-salicylate) carbonate, di-(phenyl-salicylate) carbonate and di-(benzyl-salicylate) carbonate.

Particularly preferred diaryl compounds are diphenyl carbonate, 4-tert-butylphenyl phenyl carbonate, di-(4-tert-butylphenyl) carbonate, diphenyl-4-yl phenyl carbonate, di-(biphenyl-4-yl) carbonate, 4-(1-methyl-1-phenylethyl)-phenyl phenyl carbonate, di-[4-(1-methyl-1-phenylethyl)-phenyl] carbonate and di-(methylsalicylate) carbonate.

Diphenyl carbonate is very particularly preferred.

It is possible to use either one diaryl carbonate or various diaryl carbonates.

To control or modify the end groups, for example, one or more monohydroxyaryl compound(s) which has/have not been used for the preparation of the diaryl carbonate(s) used can additionally be employed as chain terminators. In this context, these can be those of the general formula (III)

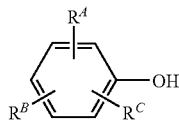

(III)

wherein
$R^A$ represents linear or branched $C_1$-$C_{34}$-alkyl, $C_7$-$C_{34}$-alkylaryl, $C_6$-$C_{34}$-aryl or —COO—$R^D$, wherein $R^D$ represents hydrogen, linear or branched $C_1$-$C_{34}$-alkyl, $C_7$-$C_{34}$-alkylaryl or $C_6$-$C_{34}$-aryl, and
$R^B$, $R^C$ independently of one another are identical or different and represent hydrogen, linear or branched $C_1$-$C_{34}$-alkyl, $C_7$-$C_{34}$-alkylaryl or $C_6$-$C_{34}$-aryl.

Such monohydroxyaryl compounds are, for example, 1-, 2- or 3-methylphenol, 2,4-dimethylphenol, 4-ethylphenol, 4-n-propylphenol, 4-iso-propylphenol, 4-n-butylphenol, 4-isobutylphenol, 4-tert-butylphenol, 4-n-pentylphenol, 4-n-hexylphenol, 4-iso-octylphenol, 4-n-nonylphenol, 3-pentadecylphenol, 4-cyclohexylphenol, 4-(1-methyl-1-phenylethyl)-phenol, 4-phenylphenol, 4-phenoxyphenol, 4-(1-naphthyl)-phenol, 4-(2-naphthyl)-phenol, 4-tritylphenol, methyl salicylate, ethyl salicylate, n-propyl salicylate, iso-propyl salicylate n-butyl salicylate, iso-butyl salicylate, tert-butyl salicylate, phenyl salicylate and benzyl salicylate.

4-tert-Butylphenol, 4-iso-octylphenol and 3-pentadecylphenol are preferred.

Suitable branching agents can be compounds having three and more functional groups, preferably those having three or more hydroxyl groups.

Suitable compounds having three or more phenolic hydroxyl groups are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl]-propane, 2,4-bis-(4-hydroxyphenyl-isopropyl)-phenol and tetra-(4-hydroxyphenyl)-methane.

Other suitable compounds having three and more functional groups are, for example, 2,4-dihydroxybenzoic acid, trimesic acid (trichloride), cyanuric acid trichloride and 3,3-bis-(3-methyl-4-hydroxyphenyl)-2-oxo-2,3-dihydroindole.

Preferred branching agents are 3,3-bis-(3-methyl-4-hydroxyphenyl)-2-ox-2,3-dihydroindole and 1,1,1-tri-(4-hydroxyphenyl)-ethane.

Both polymethyl(meth)acrylate (PMMA) and impact-modified PMMA (im-PMMA) and blends of PMMA or of im-PMMA can be employed as the polymethyl (meth)acrylate. They are obtainable under the brand name Plexiglas from Röhm GmbH. Polymethyl(meth)acrylate is understood as meaning both polymers of methacrylic acid and its derivatives, for example its esters, and polymers of acrylic acid and its derivatives, and mixtures of the two above components.

Polymethyl(meth)acrylate plastics having a methyl methacrylate monomer content of at least 80 wt. %, preferably at least 90 wt. % and optionally 0 wt. % to 20 wt. %, preferably 0 wt. % to 10 wt. % of further vinylically copolymerizable monomers, such as e.g. C1- to C8-alkyl esters of acrylic acid or of methacrylic acid, e.g. methyl acrylate, ethyl acrylate, butyl acrylate, butyl methacrylate, hexyl methacrylate and cyclohexyl methacrylate, furthermore styrene and styrene derivatives, such as, for example, [alpha]-methylstyrene or p-methylstyrene, are preferred. Further monomers can be acrylic acid, methacrylic acid, maleic anhydride, hydroxy esters of acrylic acid or hydroxy esters of methacrylic acid.

The thermoplastics can furthermore contain fillers, optionally preferably in an amount of up to 30 wt. %. Such fillers are known to the person skilled in the art. For example, inorganic fillers, such as e.g. inorganic pigments, can be employed.

The suitable inorganic pigments include, for example, oxides, such as silicon dioxide, titanium dioxide, zirconium dioxide, iron oxide, zinc oxide and chromium(III) oxide, sulfides, such as zinc sulfides and cadmium sulfides, and salts, such as barium sulfate, cadmium selenide, ultramarine and nickel chromium titanate. Carbonates, such as calcium carbonate and barium carbonate, and carbon black are likewise suitable as pigments in the present connection. A very particularly preferred coloured pigment is barium sulfate. These pigments are incorporated into the composition of the invention in an amount of from 0.1 to 30 wt. %, preferably 2 to 15 wt. %, based on the weight of the composition.

The thermoplastics can furthermore contain scattering pigments as fillers, which are well known to the person skilled in the art and are described, for example, in WO-A 2007/045380.

These fillers can preferably be employed in average particle sizes of from 0.01 µm to 50 µm.

The film pieces of at least one thermoplastic which are to be formed according to the invention can also be a multi-layered coextruded film of at least two different thermoplastics. In this context, the film is preferably an at least two-layered coextruded film having a layer build-up comprising
(1) at least one upper layer of a thermoplastic having a Vicat softening temperature B/50 ($T_{Vicat1}$) and
(2) at least one layer underneath of a thermoplastic having a Vicat softening temperature B/50 ($T_{Vicat2}$) which is higher than the Vicat softening temperature B/50 ($T_{Vicat1}$).

The multi-layered coextruded film is particularly preferably an at least three-layered, preferably a three-layered coextruded film having a layer build-up comprising
(1) at least one upper and one lower layer of a thermoplastic having a Vicat softening temperature B/50 ($T_{Vicat1}$) and
(2) at least one layer, preferably in between, of a thermoplastic having a Vicat softening temperature B/50 ($T_{Vicat2}$) which is higher than the Vicat softening temperature B/50 ($T_{Vicat1}$).

In the process according to the invention, the side of the film section of the coextruded film of the thermoplastic having the Vicat softening temperature B/50 ($T_{Vicat1}$) is advantageously heated up to the stated film surface temperature. The temperature to which this side of the film section is heated is preferably between $T_{Vicat1}$ and $T_{Vicat2}$.

Instead of the coextruded films described above, the films used can also be multi-layered laminate composite films, also called laminate films for short in the following, in which at least two layers of at least two different thermoplastics with $T_{Vicat1}$ and $T_{Vicat2}$ are laminated on to one another.

In particularly preferred embodiments, the thermoplastic with $T_{Vicat2}$ is a polycarbonate or copolycarbonate, and the thermoplastic with $T_{Vicat1}$ is a poly- or copolyacrylate or poly- or copolymethacrylate, such as e.g. polymethyl methacrylate or poly(meth)acrylate, or a blend of at least one polycarbonate or copolycarbonate with at least one poly- or copolycondensate of terephthalic acid. The poly- or copolyacrylates or poly- or copolymethacrylates already mentioned above, such as e.g. polymethyl methacrylate or poly(meth)acrylate, or blends of at least one polycarbonate or copolycarbonate with at least one poly- or copolycondensate of terephthalic acid are possible for this. Particularly preferred blends for the thermoplastic with $T_{Vicat2}$ are blends of polycarbonate or copolycarbonate with poly- or copolybutylene terephthalate in the compositions already mentioned above.

The use of such coextruded films or laminate films in the process according to the invention offers the additional advantage that even with relatively long heating to the corresponding temperature above the Vicat softening temperature of the upper layer, because of the lower or middle layer with a higher Vicat softening temperature the entire film does not become plastic and the risk of visible sagging under the film's own weight can be avoided or reduced more easily. In particular, if the at least three-layered coextruded films or laminate films are employed, the core of such a coextruded film or laminate film in the sense of the layer in between of a thermoplastic having a Vicat softening temperature B/50 ($T_{Vicat2}$) advantageously remains at temperatures below the Vicat softening temperature ($T_{Vicat2}$) when the process according to the invention is carried out.

In very particularly preferred embodiments of the process according to the invention, it is such a process for the production of an at least partly printed, metallized and/or otherwise coated thermoformed film part with at least the following process steps:
a flat film piece which is at least partly printed, metallized and/or otherwise coated on one or on both surface(s) and is made of polycarbonate (PC), preferably of polycarbonate based on 2,2-bis-(4-hydroxyphenyl)-propane (bisphenol A) as the dihydroxyaryl compound, and which includes at least one film section which corresponds to the thermoformed part to be produced with respect to size and printing, metallizing and/or coating is provided;
this film piece is mounted in a defined arrangement on a frame, only the edge sections of the film piece lying on the frame;
the film piece lying on the frame in this way is introduced into a heating zone, and at least the film section is heated there to a given temperature; and
the film piece heated in this way is then introduced rapidly into a forming zone and is charged there immediately and directly with a fluid pressure means of greater than 20 bar and is formed isostatically to give the desired thermoformed part within a period of time of less than 5 sec, characterized in that such a heating is carried out so that at least one side of the entire film section or of the predominant part of the film section has a film surface temperature in the range of from 20 to 65° C., preferably from 30 to 60° C., particularly preferably from 35 to 60° C. above the Vicat softening temperature B/50, very particularly preferably of from 180° C. to 200° C.

In the context of the present invention, it is sufficient for only one side of the entire film section or of the predominant part of the film section to be heated to a film surface temperature in the range mentioned. The other, opposite side of the entire film section or of the predominant part of the film section can remain at a low film surface temperature, for example at a film surface temperature up to about 10° C. lower.

Preferably, in the process according to the invention such a heating is carried out so that both sides of the entire film section or of the predominant part of the film section have a film surface temperature in the range of from 10 to 65° C. above the Vicat softening temperature B/50.

If this heating is carried out with the aid of surface heating, for example with the aid of hot air or with the aid of radiant heaters, even when the film surface temperature in the range mentioned is reached the core region of the film piece will still have a lower core region temperature than this film surface temperature, and this core region temperature can preferably be up to about 30° C., preferably up to 20° C. lower than this film surface temperature.

The core region preferably comprises about 60 to 80% of the film cross-section, or in the case of the three-layered coextruded films, preferably the region of the middle layer.

The above statements relating to the film surface temperature also apply to the following information on the film surface temperature in the following description and the claims.

If heating is carried out only to a film surface temperature below the range mentioned, in the very particularly preferred embodiments of the process according to the invention using polycarbonate to less than 180° C., restoring forces and stresses which impair the dimensional stability of a single-layered film part can still occur in the thermoformed film part. On the other hand, if the entire film section is heated to a film surface temperature significantly above the range mentioned, in the very particularly preferred embodiments of the process according to the invention using polycarbonate to above 200° C., local flow processes which endanger the reproduction accuracy may already occur.

Preferably, in the very particularly preferred embodiments of the process according to the invention using polycarbonate, the entire film section or the predominant part of the film section is heated to a film surface temperature in the range of from 185° C. to 195° C. A film surface temperature of about 190° C. is particularly preferred here. A film surface temperature of about 190° C. is sufficient for the typical commercially accessible PC films, preferably those based on bisphenol A, and delivers good results.

In the case of further very particularly preferred embodiments of the process according to the invention using a film piece of polymethyl methacrylate or poly(meth)acrylate (PMMA), a film surface temperature in the range of from 20 to 65° C., preferably 25 to 50° C. above the Vicat softening temperature B/20, very particularly preferably from 130 to 150° C. is envisaged. If the PMMA film piece is heated only to a film surface temperature of less than 130° C. in this case, restoring forces and stresses which impair the dimensional stability of a single-layered film part of PMMA can still occur in the thermoformed film part. On the other hand, if the entire film section is heated to a film surface temperature significantly above 150° C., local flow processes which endanger the reproduction accuracy may already occur. The film section of PMMA material is preferably heated to a film surface temperature in the range of from 135° C. to 145° C. A film surface temperature of about 140° C. is particularly preferred here. A film surface temperature of about 140° C. is sufficient for the typical conventional PMMA films and delivers good results.

Advantageous embodiments and further developments of the process according to the invention emerge from the subclaims and/or are described above and in the following.

The inventor named for the present application has conducted extensive investigations and experiments in order to achieve the abovementioned object. It was found during these: The restoring forces occurring in the film parts thermoformed by the known HPF process are based on internal stresses which are generated during production of the film, by extrusion and during subsequent calendering, and which are not degraded and compensated sufficiently during the later high pressure forming carried out below the softening temperature. The inventor gradually heated a flat, non-printed 300 µm thick PC film (Makrofol® from Makrolon® from BAYER MATERIALSCIENCE AG) held on a frame to above the Vicat softening temperature B/50 of 145° C. The film temperature was measured by the film surface temperature with the aid of a thermal imaging camera. An increase in area in each case in the running direction and in the transverse direction takes place according to the linear thermal longitudinal expansion coefficient (about $70 \times 10^{-6}$ $K^{-1}$). At a film surface temperature of about 170° C., the previously flat film becomes visibly wavy, presumably because previously frozen-in mechanical stresses originating from the production process are now released and deform the film. During further heating, this waviness disappears. When a film surface temperature of about 190° C. is reached, the film hangs flat and evidently stress-free on the frame. The entire film does not yet show plastic flow and does not sag visibly in the centre which is not supported by the frame. This state is maintained unchanged for at least about 4 to 5 sec. However, if the film is kept at this film surface temperature of about 190° C. for longer than about 10 sec, the film starts to sag visibly under its own weight in the centre which is not supported by the frame. The core region is now evidently also heated to this temperature and starts to become plastic. If a film surface temperature of about 220° C. is reached during rapid heating with the aid of radiant heaters, the film starts to sag visibly in the centre which is not supported by the frame. The flow transition region is evidently reached, and the tear strength has decreased to the extent that the structure and shape of the original film is no longer retained. At temperatures in the flow transition region the mechanical strength, for example determined by the shear modulus G of the film material, decreases rapidly, and the very high pressure forming or the high pressure forming or HPF process is no longer possible due to a lack of sufficient strength of the film material.

From all this it follows: The known high pressure forming or HPF process evidently can be carried out a considerably higher film temperature than previously assumed, namely at a film surface temperature significantly higher than the Vicat softening temperature B/50 of the particular film material. It seems expedient here to keep the dwell time of the film at the film surface temperature envisaged according to the invention as short as possible, that is to say once the film surface temperature envisaged according to the invention has been reached, to bring the film into the forming zone within a period of time of less than 10 sec, preferably less than 5 sec, particularly preferably less than 2 sec, and to carry out a sudden forming there immediately. As a result, during the heating in a heating zone equipped with radiant heaters heating of the film section beyond the envisaged film surface temperature is prevented, and the core region of the film remains at a core region temperature below this film surface temperature envisaged according to the invention. This improves the reproduction accuracy of any graphic, functional and/or decorative design on the film surface during the subsequent forming.

The process according to the invention has been developed on the basis of these results. In very particularly preferred embodiments of the process according to the invention, commercially accessible films of PC, such as, for example, various Makrofol® variants, preferably those based on 2,2-bis-(4-hydroxyphenyl)-propane (bisphenol A) as the dihydroxyaryl compound, are preferably heated to a film surface temperature in the range of from 20 to 65° C., preferably 30 to 60° C. above, particularly preferably 35 to 60° C. above the Vicat softening temperature B/50, very particularly preferably from 180° C. to 200° C., it also being possible for individual film piece segments to be heated further to an increased temperature which exceeds this film surface temperature by at least 3° C. and by not more than 10° C., and are formed with this film temperature under the conditions of the HPF process.

Dimensionally stable thermoformed film parts which are free from any restoring forces are obtained by this means. These products can be used in a single-layered form which is not further reinforced or in the form of shaped articles injection-moulded on the reverse, as display and instrument covers.

In the same manner, in further very particularly preferred embodiments of the process according to the invention, commercially accessible films of PMMA, such as, for example, various types of Plexiglas® films and films from other PMMA variants, are heated to a film surface temperature in the range of from 20 to 65° C., preferably 25 to 50° C. above the Vicat softening temperature B/50, very particularly preferably from 130° C. to 150° C., it also being possible for individual film piece segments to be heated further to an increased temperature which exceeds this film surface temperature by at least 3° C. and by not more than 10° C., and are formed with this film temperature under the conditions of the HPF process. Dimensionally stable thermoformed film parts which are free from any restoring forces are obtained by this means. These products can be used in a single-layered form which is not further reinforced or in the form of shaped articles injection-moulded on the reverse, as display and instrument covers.

The process according to the invention is explained in more detail in the following.

The known and commercially accessible PC films are possible as the polycarbonates (PC) for the production according to the invention of thermoformed film parts. These are typically polyesters of carbonic acid with aromatic dihydroxy components, in particular based on bisphenol A and derivatives thereof. Selected Makrofol® films (of Makrolon® from BAYER MATERIALSCIENCE AG) are particularly suitable here. Makrolon® based on bisphenol A has a glass transition temperature of 145° C., a Vicat softening temperature B/50 (50 N; 50° C./h; in accordance with ISO 306) of from about 144 to 146° C. and has a heat distortion point under a load of 0.45 MPa (in accordance with ISO 75-1, -2) of about 137° C. The Makrofol® films Makrofol® DE, in this case preferably matted on one side, and the diffuser film Makrofol® BL are particularly suitable for use in very particularly preferred embodiments of the process according to the invention.

These films are typically employed in the thickness range of from 100 μm to 2,000 μm, preferably in the thickness range of from 125 μm to 750 μm, particularly preferably in the thickness range of from 125 to 600 μm and very particularly preferably in the thickness range of from 200 to 500 μm.

The known and commercially accessible films of PMMA and of modified, in particular impact modified PMMA variants [poly(meth)acrylate], are possible as polymethyl methacrylates or poly(meth)acrylates (PMMA) for the production according to the invention of thermoformed film parts in further very particularly preferred embodiments of the process according to the invention. Extruded and rolled Plexiglas® films (trade mark of Röhm GmbH & Co. KG, Darmstadt, Germany), which are marketed under the trade name Plexiglas® XT (XT stands for extruded), are particularly suitable here. Plexiglas® XT has a glass transition temperature of 110° C., a Vicat softening temperature B/50 (in accordance with ISO 306) of 103° C. and under a load of 0.45 MPa has a heat distortion point B (in accordance with ISO 75 HDT/B) of 100° C. The Plexiglas® films Plexiglas® film 99524 and Plexiglas® film 99526 are particularly suitable for use in the process according to the invention.

Poly(meth)acrylates which comprise methyl methacrylate to the extent of 80 to 99.9 wt. % and further comonomers to the extent of 0.1 to 20 wt. % are possible, for example, for PMMA films of impact-modified PMMA. Suitable comonomers are e.g. esters of methacrylic acid (e.g. ethyl methacrylate, butyl methacrylate, hexyl methacrylate, cyclohexyl methacrylate), esters of acrylic acid (e.g. methyl acrylate, ethyl acrylate, butyl acrylate, hexyl acrylate, cyclohexyl acrylate) or styrene and styrene derivatives, such as, for example, α-methylstyrene or p-methylstyrene. Impact modifying agents for polymethacrylate plastics are adequately known. Crosslinked single- or multi-shell emulsion polymers which comprise e.g. crosslinked polybutyl acetate can be employed as impact modifiers for the poly(meth)acrylates. Such impact-modified PMMA films are also commercially accessible.

These PMMA films are also typically employed in the thickness range of from 100 μm to 2,000 μm, preferably in the thickness range of from 125 μm to 600 μm and particularly preferably in the thickness range of from 200 μm to 500 μm.

Because dimensionally stable thermoformed film parts are already obtained from single-layered films by the process according to the invention, single-layered films of the type described above are preferably employed. "Single-layered" here relates solely to the film or the film body and does not include addition layers and deposits of other materials applied. "Single-layered" furthermore includes the multi-layered coextruded films described above, which are produced and employed in the process as one layer, and the laminate films, which are likewise employed in the process as an entire film in the sense of "single-layered". A "single-layered film" can consequently be printed, metallized and/or otherwise coated, where otherwise coated also includes, for example, application of at least one further layer by means of gluing and/or lamination, without being limited thereto. At least one such further layer applied by means of gluing and/or lamination can also be one of a non-thermoplastic material. These single-layered films have been at least partly printed, metallized and/or otherwise coated before the high pressure forming according to the invention is carried out at an elevated film surface temperature. The films can also have been coated, for example, with a deformable protective layer, such as e.g. a deformable scratch-resistant coating, or deformable haptic effect layer, such as e.g. a deformable soft touch coating (cf. EP-A 1647399), before the high pressure forming according to the invention at an elevated film surface temperature is carried out.

The three-dimensionally formed thermoformed part obtainable according to the invention is provided, for example, with a graphic, functional and/or decorative design which follows a given layout and is typically applied as the background on the reverse of a transparent film, for example as printing, metallizing and/or other coatings, and can be perceived through the film layer. Transparent film materials are therefore preferably employed. A transparent film can also be provided with a surface matting or with a diffusing lacquer layer on the surface opposite to the printing, metallizing and/or other coating.

The process according to the invention is particularly suitable for production of the fixed scales, scale divisions and display means provided on the dashboard of a motor vehicles for the instruments and display devices provided there, and further symbols, images and pictograms which are illuminated as required by incident light or light shining through and in this way deliver a visually perceptible display. These instruments include the vehicle speed display, or the tachometer, the display element of which often has a raised, annular arrangement with scale graduation marks to which are assigned numbers which indicate the speed. A centrally arranged, pivoted pointer is directed towards a particular scale graduation mark with the aid of the current vehicle speed, in order to display in this way the current vehicle speed (km/h or mph) with the aid of the assigned number. Because of this annular, dial-like arrangement, tacho screens are also referred to here. The display element for displaying the speed of rotation of the engine is constructed in a similar manner; a display in numbers×100 per min is typically given here. Display means of similar construction with a raised, semicircular ring structure serve to display the tank level and the oil pressure in the engine chamber. Instead of the raised annular structures, these display elements can also be mounted on annular flat segments which fall away from the main plane in tapered form (with large taper angles of 160° and more). In addition, raised metallized bars and other ornamental elements can often be envisaged. A product by way of example produced according to the invention is envisaged for a combination instrument and has a transparent section centrally for a navigation display, a tacho screen on the right of this and the revolution display on the left of this.

The scale graduation marks, numbers, letterings, symbols, images, pictograms and the like belonging to these display elements are applied to one surface of the initially flat film; this can be effected, for example, in a multi-stage screen printing process and/or by application of a coating, which is applied in several successive steps in each case in a liquid layer. Offset printing, gravure printing, transfer printing or digital printing, for example, are available for this alternative application. This printing which follows a given layout is preferably applied by screen printing. In the multi-stage screen printing process, a black coloured layer in which the scale graduation marks, numbers, letterings, symbols, images, pictograms and the like which are visible later are left blank in the negative print is often initially first applied; these blank areas are backed with differently coloured layers in later printing steps.

Coloured lacquers based on polycarbonate or polyester-polyurethane typically serve for application of these coloured layers. Flexible printing inks of high heat resistance for printing films of plastic which expressly withstand the conditions of the very high pressure process envisaged here and, where appropriate, a subsequent insert moulding are described, for example, in the document DE 198 32 570 C2. The document DE 101 51 281 A1 describes coloured lacquers which are particularly suitable for screen printing of PMMA films and withstand the conditions of the very high pressure forming and possibly a subsequent insert moulding. Liquid screen printing processes which are suitable specifically for these uses are marketed commercially, for example, by PRÖLL KG, 91781 Weißenburg, Germany.

Thicker layers of metal and metallizings can likewise be applied by the screen printing process. Thinner layers of metal with layer thicknesses of from 5 nm to 250 nm, in particular from 15 nm to 60 nm, which on the one hand impart a metallic shine and on the other hand are transparent to light, can be applied with the aid of physical vapour deposition (PVD) or chemical vapour deposition (CVD) or with the aid of a suitable combination of these processes. The superfluous sections of metal layer which are not desired for generating certain functions (for example electrical contacting) or for certain graphic or decorative design patterns can be removed by laser treatment. Suitable metals here include, for example, aluminium, titanium, chromium, copper, gold, silver, molybdenum, indium and iridium, and metal alloys, such as e.g. alloys of indium, tin or copper, preferably indium-tin alloys, particularly preferably indium-tin-copper alloys (cf. e.g. US-A 2008/0020210).

At least one further layer of one or more electroluminescent compounds can furthermore be applied to the metal layers. Such electroluminescent compounds are known to the person skilled in the art (cf. e.g. EP-A 1 647 399). Zinc sulfide which is doped with silver or copper can be employed, for example, as an electroluminescent compound.

Transparent sections in which the display of any liquid crystal displays is visible later can furthermore also remain on the film piece to be formed. A colourless structured lacquer which imparts a matt non-reflecting surface to the finished product is often applied to the other surface opposite the coloured layers. Depending on the particular arrangement of the thermoformed part envisaged for the intended use, the structured lacquer layer will be—according to the sight of the viewer—on the front side of the thermoformed part, and the coloured layers of the graphic design will be on the reverse of the thermoformed part.

A preferred embodiment of the process according to the invention relates to the production of tacho screens and/or revolution counter screens which have the graphic, functional and optionally decorative embodiment described above. For production of such tacho screens or revolution counter screens, transparent film pieces which have been printed, metallized and/or otherwise coated according to a given layout for tacho screens or revolution counter screens are provided and are thermoformed according to the invention.

A flat film which is provided on the one surface with the multi-layered graphic, functional and/or decorative design explained above and which can have a layer of colourless structured lacquer on the other surface is subjected to forming with the aid of the process according to the invention to give a permanently three-dimensionally formed and dimensionally stable thermoformed part. The customers for such thermoformed parts require an extremely accurate positioning of the graphic, functional and/or decorative design on the finished thermoformed part here. The deviations between this design on the originally flat film and the corresponding design on the finished thermoformed part are preferably not more than ±0.1 mm.

The abovementioned at least partly printed, metallized and/or otherwise coated films are employed in the process according to the invention in the form of individual film pieces cut to size. For such preferably rectangular, relatively small film pieces, dimensions with a length of from 160 mm to 450 mm and a width of from 160 mm to 305 mm, for example, can be envisaged. Film pieces of this area can be processed particularly easily with the aid of commercially accessible apparatuses (for example HDVF KUNSTSTOFF-MASCHINEN GMBH, 82377 Penzberg, Germany) to give the thermoformed film parts aimed for here. Larger film pieces can typically have a length of up to a maximum of 1,200 mm and a width of up to a maximum of 700 mm.

Depending on the size of the finished thermoformed part and the production machines available, a multiple-use working procedure can be envisaged. For high quality tacho screens and similar display covers, one-use film sizes are preferably used, because a higher reproduction accuracy can be achieved with the one-use working procedure.

For the processing according to the invention, the flat film piece is mounted in a defined arrangement on a frame-like support, a frame-like pallet or the like, which is called a frame for short in the following. A frame having a crosspiece width of from 50 mm to 100 mm is particularly suitable. The edge sections of the film piece typically lie with a width of from 20 mm to 30 mm on these crosspieces forming the frame. Circular positioning pins which protrude from the crosspieces and engage in elongated holes made in the edge sections of the film piece ensure the defined arrangement. Elongated holes take account of the increase in area of the film piece during heating to the film surface temperature envisaged according to the invention.

The film piece held on such a frame is introduced into a heating zone and heated there to the film surface temperature. The conventional and known heating measures can be envisaged for this heating, such as, for example, convection heating with the aid of hot air or heating liquid or hot bath as the source of heat, or radiant heating, for example with the aid of infrared radiation or quartz heaters. Heating measures for contactless heating are preferred in the context of the invention; radiant heating with the aid of infrared radiation is particularly preferred. High frequency heating is less desirable, because in this case the core region is also heated to the surface temperature. A heating zone which has two horizontally aligned heating fields of the same area arranged at a distance from one another and aligned with one another is preferably envisaged. The film piece held on the frame is held centrally between and at the same distance from the two heating fields for a period of time. Each heating field typically has a larger area than the arrangement of frame and film piece aligned with one another. For example, a heating field having dimensions of 486 mm×455 mm can be envisaged for a film piece having dimensions of 450 mm×250 mm, so that the edge regions of the film section within the frame which do not lie on the frame are also heated reliably to the envisaged film surface temperature.

Each heating field comprises a number of adjacent infrared surface heaters or quartz heaters which can be activated individually. In order to be able to undertake a differential heating of individual film piece segments on the film section, which is preferably envisaged—and is explained in more detail below—infrared surface heaters or quartz heaters of the smallest possible format are preferably employed. Solid ceramic heaters having dimensions of 60 mm×60 mm which assume a surface temperature of approximately 300° C. at a power input of 125 W are particularly suitable, for example, here. Infrared surface heaters of this type are available from and marketed by, for example, FRIEDRICH FREEK GMBH, 58708 Menden, Germany.

A distance between the one heater surface and the other heater surface located opposite of from about 50 mm to 100 mm is typically envisaged. As a result of this, the radiant heat issuing from the particular adjacent edge regions of adjacent infrared surface heaters or quartz heaters is achieved. The effects of the surface heater limits are minimized, and a uniform temperature distribution is achieved on the film surface.

Heating fields which have an arrangement of 7 rows of solid ceramic heaters of this type in the film feed direction and an arrangement of 6 rows of solid ceramic heaters of this type in the transverse direction are particularly suitable for the process according to the invention and are preferably envisaged.

The average heating field surface temperature is kept at about 300° C. A rough control of the film surface temperature can therefore take place via the dwell time of a given film piece in the heating zone. The film piece to be heated is typically kept in such a heating zone for about 4 sec to 12 sec—depending on the layer thickness. For example, a PC film piece 300 μm thick at the ambient temperature (about 20° C.) is heated up to the film surface temperature envisaged according to the invention of about 190° C. in a heating zone of the type described above within a period of time of about 6 sec.

Each infrared surface heater or quartz heater of this type can be activated individually. Activation is via the electrical power input. A higher power input generate a higher surface temperature on a given infrared surface heater or quartz heater. A fine control of the temperature distribution on the surface of individual film piece segments, which are each assigned to a particular infrared surface heater or quartz heater, can therefore additionally be made by controlling the power input of the individual infrared surface heaters or quartz heaters. The effect of this fine control is greater the lower the average surface temperature. The heating of the film piece is therefore carried out according to the invention in such a heating zone which is demarcated by two heating fields aligned with one another, each of which has an average heating field surface temperature of about 300° C.

In order to achieve optimum results, the process according to the invention requires a comparatively accurate control and monitoring of the film surface temperature on the film section. According to a further preferred embodiment of the process according to the invention, recording of the surface temperature to which the film section in the heating zone has been heated is therefore envisaged.

This further preferred embodiment of the process according to the invention is characterized in that the film piece is kept in the heating zone for heating over a period of time at a distance from at least one heating field built up from a number of infrared surface heaters or quartz heaters which can be activated individually; and on the way from the heating zone to the forming zone the film piece heated in this way passes a temperature measurement station in which the temperature distribution on a film surface is scanned, rendered visible and/or shown in another manner with the aid of a thermal imaging camera.

A differential heating can furthermore be carried out, for which each individual infrared surface heater or quartz heater is activated individually in order thus to minimize the temperature differences on the film section which can be seen from the temperature distribution, and to heat at least one side of the predominant film section to a film surface temperature in the abovementioned range for the particular film material, and optionally to heat individual selected film piece segments to a higher temperature which exceeds this film surface temperature by at least 3° C. and by not more than 10° C.

The following advantages are achieved with this embodiment of the process according to the invention:

Ceramic infrared heaters of this type emit their radiant heat in the wavelength range of from 2.5 to 10 μm. Heating of the film depends on the absorption capacity and on the reflection properties in this wavelength range. In particular, the printing, metallizing and/or other coating which is on the film section under consideration here and which determines the later intended use influences this absorption capacity and these reflection properties. A dark to black coating section intensifies the uptake of heat there. A transparent window on the film section or a light-coloured coating section reduce the uptake of heat. A metallic coating, here for example Al, Ti or Cr, in particular greatly reduces the uptake of heat. The film surface temperature which can be achieved in a given arrangement with given infrared surface heaters therefore also depends on the nature and size of the printing, metallizing and/or otherwise coating of the film section. For an accurate control and monitoring of the film temperature, it is therefore desirable to record and show the temperature on the film surface. This can be achieved with this preferred working procedure.

For a given thermoformed part, for example an instrument cover with a tacho arranged on the right, a revolution counter arranged on the left and a navigation display arranged centrally, various segments of the film sections must be formed to different degrees. Typically, geometric formings of a higher degree require a higher flexibilizing of the particular film piece segment, which can be achieved with a locally higher heating of the film piece segment(s) in question, in the present example, for example, for the partial external regions for the tacho and revolution counter. In the central regions which are to undergo little forming, for example for the navigation display, the shrinkage properties can be reduced by a lower heating, and the tolerance of the entire display can therefore be improved. An exact casting of sharp-edged contours and/or the accurately fitting reproduction of fine embossings and engravings, which can optionally be provided with small break-throughs, can also be made possible by a higher flexibilizing of a given film piece segment, compared with the surrounding film material. Consequently, the locally different extent of forming of individual film piece segments may also require a locally different heating of individual film piece segments, which can be ensured with the aid of recording of the surface temperature in the individual film piece segments and corresponding activation of the infrared surface heaters which heat precisely these film piece segments.

Finally, by an appropriate activation and adjustment of different heating temperatures on various individual infrared surface heaters, a "shifting" of the printed-on pattern or layout on the film section can be achieved. In such film piece segments which are heated to a moderately higher temperature than the regular uniform film surface temperature, greater longitudinal expansion takes place compared with those film piece segments which are heated only to the regular uniform film surface temperature. The side which is expanded more (because it is heater to a higher temperature) shifts the printed-on pattern or layout towards the side which has expanded less because it is cooler. In this manner, pressure-related deviations in position of between 0.1 mm and 1.5 mm can still be corrected during the forming process. This measure also requires exact knowledge of the temperature distribution on the surface of the heated film section, in order to be able to activate in a targeted manner those infrared surface heaters which are to heat individual film piece segments to a higher temperature than the regular uniform film surface temperature.

According to a further embodiment of the process according to the invention, heating of individual film piece segments to a clear higher temperature than the regular uniform film surface temperature is therefore carried out in those selected film piece segments in which a higher flexibilizing of the film material is to be achieved. In particular, those film piece segments in which a particularly high degree of forming of the originally flat films is to take place can be selected here.

This higher flexibilizing may furthermore be desirable for exact casting of sharp-edged contours and/or for accurately fitting reproduction of particularly finely divided embossings and/or engravings and for correction of pressure-related deviations in position. In this case, those film piece segments in which an exact casting of sharp-edged contours, an accurately fitting reproduction particularly of finely divided embossings and/or engravings and a correction of pressure-related deviations in position is to be achieved are selected for the heating to the increased temperature.

In view of the temperatures possible here in the range of from 10 to 65° C. above the Vicat softening temperature B/50, in particularly preferred embodiments of about 140° C. for the thermoformed parts of polymethyl methacrylate or poly (meth)acrylate (PMMA) and in the region of about 190° C. for the thermoformed parts of polycarbonate (PC), an infrared line camera which is designed for the temperature range of 0° C. to 400° C. and records and evaluates radiant heat in the wavelength range of from 8 µm to 14 µm is typically possible as the thermal imaging camera. The radiant heat is recorded with the aid of a line sensor which can have, for example, 128 or 256 measuring elements Infrared line cameras of this type with an appropriate evaluation circuit and evaluation software are commercially accessible. In the context of the present invention, an infrared camera which is marketed by DIAS INFRARED GMBH, 01217 Dresden, Germany under the trade name INFRALINE® has proved to be particularly suitable here.

The infrared camera INFRALINE® serves for contact-free, quantitative and largely distance-independent recording of temperature distributions on fixed and moving objects. It was developed for stationary use in industry environments and can be employed for system solutions for automated process monitoring and control and processing of measurement data on machines and installations.

The camera comprises a camera head for operating the necessary assemblies. Because it is in general installed in a location close to the process to be monitored or objects to be monitored, the camera has no operating elements. A data interface is integrated into the camera for control, monitoring and transfer of measurement values. Programming and data acquisition of measurement values can take place in combination with a PC.

The known visualization software PYROSOFT® supplied by MICROSOFT INC., which can run on PCs with the MS Windows operating system, can expediently be used for presentation and evaluation of measurement data. The temperature measured can be displayed with an accuracy of $1/10°$ K with the aid of coloured coding and/or numerical data.

With the aid of the knowledge acquired in this way about the actual "true" temperature distribution on the heated film surface, preferably on the film under-side, those infrared surface heaters which heat those film piece segments which so far—for example because of the peculiarities of the printing, metallizing and/or other coating located there—have not yet reached the envisaged film surface temperature, or which heat other selected film piece segments in which an increased flexibilizing of the film material is to be achieved and which are therefore to be heated to a higher temperature than the regular uniform film surface temperature, can be activated with a higher electrical power input in a targeted manner.

In the case of the two heating fields explained above, each of which is built up from 42 infrared surface heaters aligned with one another, this PYROSOFT® software can be programmed and evaluated, for example, such that a window or a field on the monitor is assigned to each pair of infrared surface heaters aligned with one another. The entire film piece would then be divided into 42 film piece segments, and a particular film piece segment would be heated substantially by a particular assigned pair of infrared surface heaters. The colour coding in a particular window on the monitor and/or the corresponding numerical temperature indicates the surface temperature in the assigned film piece segment, and in the case where correction is required, the electrical power supplied to the one infrared surface heater or the two infrared surface heaters of this pair of infrared surface heaters assigned to the particular film piece segment could be modified.

Depending on the nature and peculiarity of the thermoformed film part to be produced, the differential heating of the film section envisaged according to the invention can be carried out in a manner such that a selected film piece segment or several selected film piece segments are heated to the increased temperature which exceeds the film surface temperature for the particular film material by at least 3° C. and by not more than 10° C.

In the context of the present invention, it is typically envisaged that not more than 20% of all the film piece segments will be heated to the increased temperature which exceeds the film surface temperature envisaged for the particular film material by at least 3° C. and by not more than 10° C.

It is not necessary for the process step "measurement and evaluation of the temperature distribution on a film surface" to be carried out during the entire production process for production of all the thermoformed parts of a given type. It is often sufficient if this process step is carried out when a production is set up, and is then repeated at regular intervals or after production of a given number of thermoformed parts, in order to ensure and to guarantee the constant uniform quality of these thermoformed parts.

Consequently, in the context of the present invention an embodiment of the process according to the invention for the production of a number of thermoformed film parts of the same type is also envisaged, in which the process step of measurement and evaluation of the temperature distribution on a film surface is carried out only during production of some of all the thermoformed film parts of this type, and this process step is not carried out during production of the remaining portion of the thermoformed film parts of this type. It is often sufficient if this process step is carried out only during production of at least 20% of all the thermoformed film parts of a given type.

After reaching the film surface temperature envisaged according to the invention, the film piece is transferred rapidly from the heating zone into the forming zone, without noticeable cooling of the film piece taking place. Preferably, after heating to the particular envisaged film surface temperature, the film piece is transferred immediately and within a period of time of less than 2 sec into the forming zone and is formed there immediately and suddenly. Two aims are pursued and achieved here. On the one hand at least one side of the film section should still essentially have the film surface temperature envisaged according to the invention during this sudden forming which takes place under a high pressure of the pressure means. On the other hand it is advantageous if, during this sudden forming, the core region of the film section has a core region temperature which is lower than this film surface temperature. Preferably, during this sudden forming the core region temperature can be at least 10° C. lower than the particular film surface temperature. Still more preferably, after heating to the particular envisaged film surface temperature, the film piece is transferred into the forming zone immediately and within a period of time of less than 5 sec, particularly preferably less than 2 sec, very particularly preferably less than 1 sec, and is formed there immediately and suddenly. An improvement in the reproduction accuracy during the sudden forming can be achieved by this means.

Even if the heated film piece passes the temperature measurement station on the way from the heating zone to the forming zone and during this procedure the temperature distribution on the film surface is scanned, rendered visible and/or shown in another manner with the aid of the thermal imaging camera, after heating to the particular envisaged film surface temperature the film piece is transferred into the forming zone immediately and preferably within a period of time of less than 5 sec, particularly preferably less than 2 sec, very particularly preferably within a period of time of less than 1 se, and is formed there immediately and suddenly.

In the forming zone, the known high pressure forming is carried out on the film piece heated in this way. For this, the measures known from the document EP 0 371 425 81 can be applied, and the devices described there can be used. With this express reference, the content of this document which is relevant here—where helpful for understanding and for carrying out the process according to the invention—is intended also to be made a constituent of the present text.

Furthermore, the high pressure forming of the film piece heated in this way can also be carried out in a forming station with the aid of a mould, the station and the mould being described in the document DE 41 13 568 C1. With this express reference, the content of this last document mentioned which is relevant here—where helpful for understanding and for carrying out the process according to the invention—is intended also to be made a constituent of the present text.

A press corresponding to the construction known from the document DE 41 13 568 C1 can be envisaged in the forming zone. The frame holding the heated film piece is inserted into the opened mould and fixed on the lower mould half with an accurate fit. The lower mould table is raised until the mould is closed. A fluid pressure means, typically compressed air, is passed into the mould cavity located above the film piece to be formed. Forming is typically carried out suddenly under a pressure means pressure of from 20 to 300 bar. Forming is preferably carried out with the aid of heated compressed air which has a temperature of from about 60 to 80° C. on contacting of the film piece. The pressure in the mould cavity is then released, the lower mould table is lowered, the mould is opened, the formed film is detached and released from the mould, and the frame which continues to hold the cooled and formed film piece is detached from the lower mould half and returned into the starting position. The formed film piece is detached from the frame manually or automatically there and cut to size as required, in order to obtain the desired thermoformed part.

EXAMPLES

The following examples and comparison examples serve for further explanation of the present invention, without limiting this.

The drawing shows with

Figure 2:
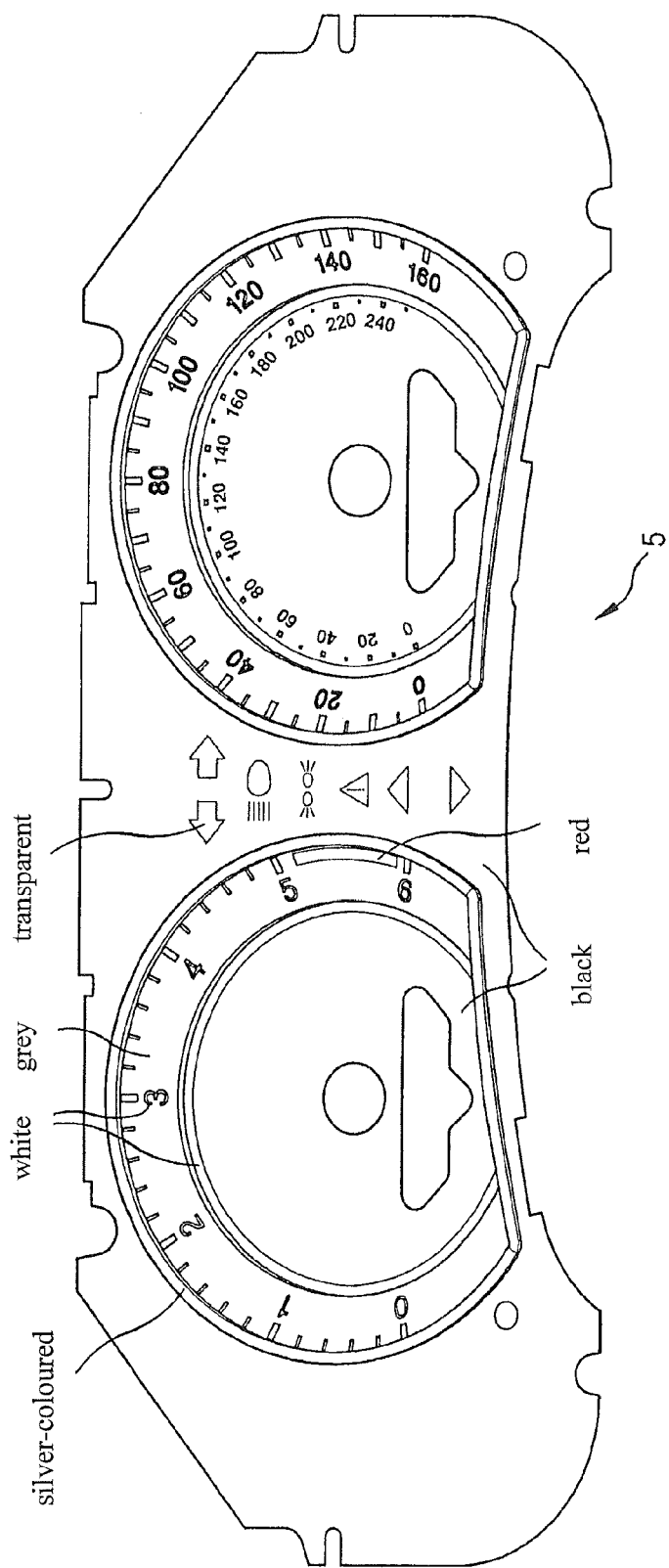
Figure 3:
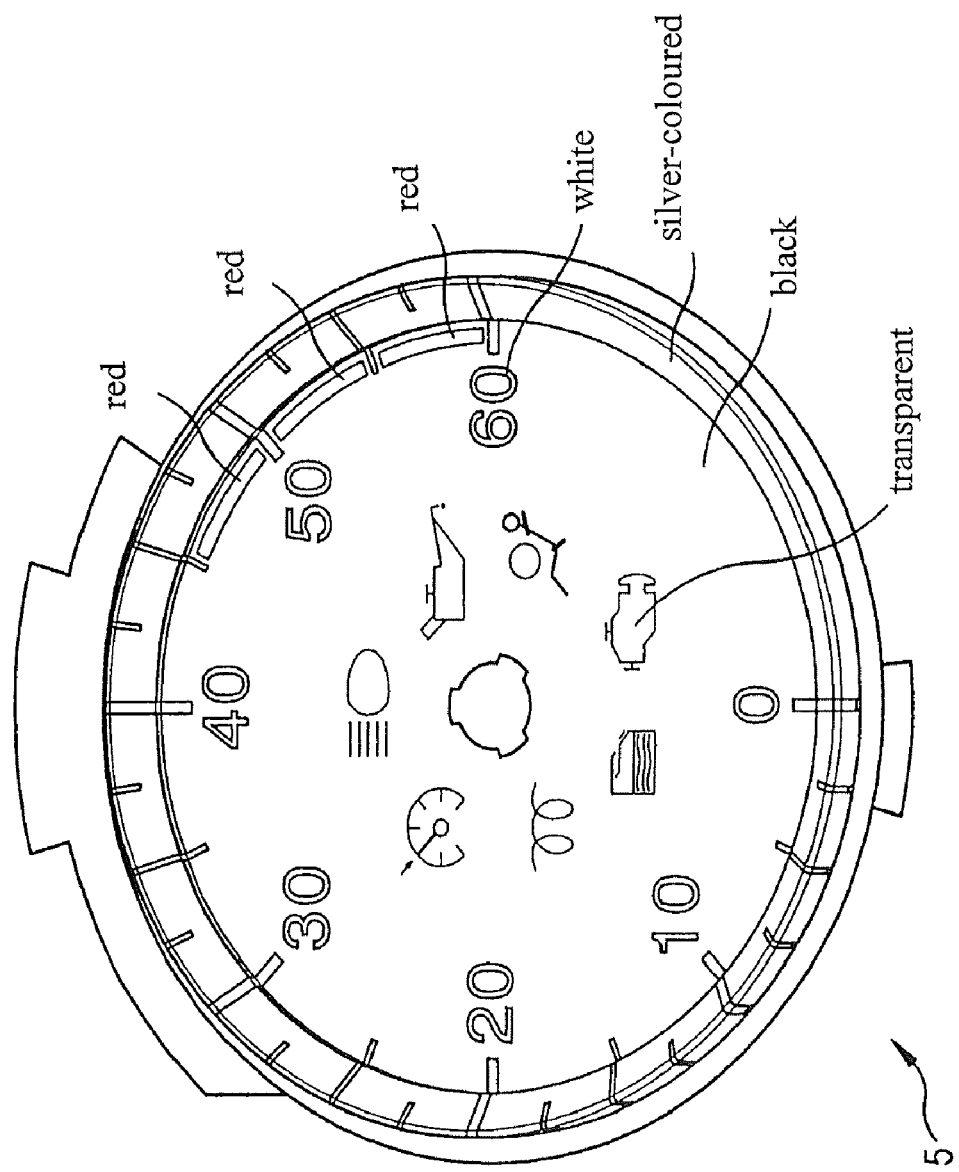

FIG. 1 with the aid of a diagram of a side view, an embodiment of a device for carrying out the process according to the invention;

FIG. 2 a PC thermoformed part produced according to the invention for a combinations instrument with a tacho screen and with a dial for a revolution counter, essentially in original size, the various colours of individual symbols and elements being shown in writing; and FIG. 3 a PMMA dial produced by the process according to the invention for a revolution counter or a "revolution counter screen", essentially in the original size, the various colours of individual symbols and elements being shown in writing.

On a device according to FIG. 1, a loading and unloading zone 10, a heating zone 20, a temperature measurement station 30 and a shaping zone 40 are constructed each in a form known per se. A slide 3 guided on rails 2 transports a rectangular frame 4 from the loading and unloading zone 10 via the heating zone 20 and the temperature measurement station 30 into the forming zone 40 and back. A step motor—not shown—designed for high accelerations and a high feed rate serves to drive the slide 3; for example, the slide 3 can be moved at a speed of 1,400 mm/sec.

In the loading and unloading zone 10, a flat printed, metallized and/or otherwise coated film piece 5 which is to be formed is mounted manually or automatically in a defined arrangement on the frame 4. The film piece 5 is supported on the frame 4 merely with its edge sections.

The heating zone 20 is demarcated by an upper heating field 21 and by a lower heating field 22. The two heating fields 21 and 22 are constructed with the same area, aligned horizontally and arranged at a distance of about 100 mm from one another and in alignment with one another. Each heating field 21, 22 has, for example, forty-two infrared surface heaters 23, each of which has dimensions of 60×60 mm and each of which can be activated individually.

In the temperature measurement station 30 is a thermal imaging camera 31, which records and evaluates the radiant heat 32, indicated here in diagram form, radiating from the under-side of the heated film piece 5. The temperature distribution obtained in this way can be shown on a monitor—not shown—it being possible for each pair of infrared heaters 23'/23" aligned with one another to be assigned to a particular field on the monitor. The temperature distribution on the surface of the under-side of the film piece can be shown with the aid of a colour coding and/or numerically.

The forming zone 40 can be equipped with a press 41 with die 42, as described in the document DE 41 13 568 C1. A compressed air container 43, from which compressed air is provided, is connected to this mould 42. The frame 4 inserted by the slide 3 into the opened mould 42 is arranged to fit accurately within the mould 42. The mould 42 is closed with the aid of the press 41, and the film piece 5 held on the frame 4 is charged immediately and directly with heated compressed air under a pressure means pressure of, for example, 160 bar and is isostatically moulded suddenly on to the contour of the mould 42. During this forming, at least one side of the film section of the film piece 5 held on the frame 4 has the film surface temperature envisaged according to the invention.

After this forming, the mould 42 is opened and the slide 3 transports the frame 4 with the formed film piece or thermoformed part back into the loading and unloading zone 10. The thermoformed part can be detached from the frame 4 automatically or manually and removed from the device 1 there.

Examples According to the Invention and Comparison Examples for Forming PC Film

The thermoformed part shown in FIG. 2 has a length of 360 mm and a height of 105 mm. The tacho screen and the revolution counter screen each have a diameter of 113 mm. The sheet of the screen is black, the numbers are white against a grey background, and the edge strip segment between the numbers "5" and "6" of the revolution counter screen is red. The pictograms arranged between the two screens are translucent and each becomes visible on activation of a background illumination assigned to each. An initially stepped and subsequently conical rise from the plane of the sheet up to a silver-coloured bulged edge, which ends about 12 mm above the plane of the sheet, is a striking feature. At this silver-coloured bulged edge, the white markings which are to point to the numbers are demarcated by very fine black edge strips.

A 375 μm thick PC film finely matted on one surface (Makrofol® OE from BAYER MATERIALSCIENCE AG), which had been printed with the abovementioned high heat resistance and flexible coloured lacquers in the multi-stage screen printing process on the non-matted surface, served as the starting material. The silver-coloured ring was applied with the aid of an Al bronze suspension.

The flat film pieces printed in this way were heated—without prior conditioning treatment—in the heating zone to the film surface temperatures stated in the following Table 1; the dwell time in the heating zone controls the film surface temperature reached. The film surface temperature was measured on the film under-side with the aid of the thermal imaging camera. In Example 3 according to the invention, the film piece segments which form the bulged edge were heated to an increased temperature which exceeded the film surface temperature by about 5° C.; for this, the pairs of infrared surface heaters assigned to these selected film piece segments were activated with a higher electrical power input.

After the particular stated film surface temperature was reached, the film was transferred immediately and rapidly (within a period of time of less than 1 sec) into the forming zone and formed there immediately and suddenly. For the forming, the film piece which continued to have the particular film surface temperature was charged with hot compressed air of about 70° C. under a compressed air pressure of 160 bar. The high temperature phase from reaching the film surface temperature to conclusion of the forming of a given film piece lasted less than 5 sec.

The results are shown in Table 1.

Example According to the Invention and Comparison Examples for Forming a PMMA Film The revolution counter screen shown in FIG. 3 has a diameter of 100 mm. The sheet is black, the lettering, including the numbers, is white and the edge strip segments between the numbers 40 and 60 are red. The pictograms grouped around the central opening are translucent and each becomes visible on activation of a background illumination assigned to each. The silver-coloured conically rising bulged edge which ends 5 mm above the plane of the sheet is a striking feature. At this silver-coloured bulged edge, the white markings which are to point to the numbers are demarcated by very fine black edge strips.

A 250 μm thick glass-clear PMMA film (Plexiglas® film "Clear 99524" from Röhm GmbH & Co. KG), which had been printed in several stages on one surface with heat-resistant and flexible coloured lacquers according to the graphic design of the dial of the revolution counter according to FIG. 3, served as the starting material.

The silver-coloured ring had been applied with the aid of an Al bronze suspension. On the other surface, the later front side, a structured lacquer layer had been applied, in order to achieve a "matt effect" or the required haptics. In addition, a hard-coat coating had been applied to this later front side, which had the effect of an additional improvement in the scratch resistance of the surface of the thermoformed part.

The results are shown in Table 2.

TABLE 1

Forming of a PC film at various temperatures

| Example | Surface temperature of the film | Core temperature* of the film | Forming result | Nature of the surface | Comments |
|---|---|---|---|---|---|
| Comparison Example 1 | 150° C. | 130° C. | Dial twisted/distorted in itself; base surface not flat; colour broken up; inaccurate removal from mould | Structure retained; cracking detectable in the material; (stretch marks) | Forming process too cold, film material not sufficiently flexibilized |
| Example 1 according to the invention | 176° C. | 154° C. | Reduction in stresses; base surface still not flat (swelling); improved removal from mould | No change in structure; significant reduction in cracking | Tendency towards improvement in the forming process - inadequate geometric stability of the dial |
| Example 2 according to the invention | 192° C. | 173° C. | Virtually stress-free dial, i.e. very good flatness after separation; accurate removal from mould of all radii and transitions; no detectable damage to the colour system | Structure undamaged; no cracking | Film remains dimensionally stable even after stamping; rotationally symmetric arrangement/positioning of the symbols constant |
| Example 3 according to the invention | 192° C., some film piece segments 197° C. | 174° C. | No stresses detectable; dial lies absolutely flat; colour system in order; no visible damage to film or colour system | Meets requirements; matt effect and haptics in order | Optimum combination of surface and core temperature; film remains dimensionally stable even after stamping; rotationally symmetric |

TABLE 1-continued

Forming of a PC film at various temperatures

| Example | Surface temperature of the film | Core temperature* of the film | Forming result | Nature of the surface | Comments |
|---|---|---|---|---|---|
| Comparison Example 2 | 210° C. | 197° C. | Virtually stress-free dial, i.e. very good flatness after separation; accurate removal from mould of all radii and transitions, slight "bulging over" of the edge, slight blistering due to solvent diffusing out | Structure of the surface is damaged; matt-black film content looks "flinty" (glossing) | arrangement/positioning of the symbols remains constant Forming process too hot, film structure becomes plastic, positioning of the symbols changes/not accurately reproduced; colour system raises blisters; removal from mould OK, appearance, colour and structure not OK |

*the core temperature has been estimated with the aid of various internal observations and values from experience

TABLE 2

Forming of a PMMA film at various temperatures

| Example | Surface temperature of the film | Core temperature* of the film | Forming result | Nature of the surface | Comments |
|---|---|---|---|---|---|
| Comparison Example 3 | 100° C. | 90° C. | Negative; film cracked/broken up | — | Forming process too cold; film material too brittle at this temperature; forming not possible |
| Comparison Example 4 | 120° C. | 110° C. | Film not broken; removal from mould not optimum - white fracture; significant stresses in forming region | Cracks detectable within the film material; surface not homogeneous | Forming possible; material still too brittle; inadequate geometric stability of the dial; white fracture changes appearance of the colour build-up |
| Example 4 according to the invention | 140° C. | 130° C. | Stress-free dial. i.e. very good flatness after separation; sharp-edged removal from mould of all radii and transitions, partial white fracture; no detectable damage to the colour system | No visible cracks; unchanged appearance of film | Minimal partial white fracture |
| Example 5 according to the invention | 140° C., some film piece segments 145° C. | 135° C. | Stress-free dial, i.e. very good flatness after separation; sharp-edged removal from mould of all radii and transitions, no white fracture; no detectable damage to the colour system | No visible cracks; unchanged appearance of film | Optimum combination of surface and core temperature; film absolutely flat; rotationally symmetric arrangement/positioning of the symbols constant; no white fracture occurs due to partial heating; constant reproducibility ensured |
| Comparison Example 5 | 160° C. | 150° C. | Severe shrinkage of the side edges; removal from mould sharp-edged; no white fracture; black colour looks bluish | Transparent regions of the film look "misty"; appearance of the film changes | Forming process too hot, film structure/transparency changes; noticeably severe shrinkage; positioning of the symbols varies/not reproduced accurately |

*the core temperature has been estimated with the aid of various internal observations and values from experiene

The invention claimed is:

1. A process for producing an at least partly printed, metallized, and/or otherwise coated thermoformed film part comprising:
   providing a flat film piece which is (1) at least partly printed, metallized, and/or otherwise coated on one surface of said flat film piece or on both surfaces of said flat film piece, (2) comprises at least one thermoplastic, and (3) comprises at least one film section which corresponds to the thermoformed part to be produced with respect to size and printing, metallizing, and/or coating;
   mounting said flat film piece in a defined arrangement on a frame, wherein only the edge sections of said flat film piece are lying on the frame;
   introducing said flat film piece mounted on said frame into a heating zone, wherein at least said at least one film section is heated to a given temperature; and
   rapidly introducing said heated flat film piece into a forming zone and charging said heated flat film immediately and directly with a fluid pressure means under a pressure means pressure of greater than 20 bar to isostatically form the desired thermoformed part in less than 5 seconds;
   wherein said heating is carried out as contactless heating so that at least one side of the entire said at least one film section or of the predominant part of said at least one film section has a film surface temperature in the range of from 10° C. to 65° C. above the Vicat softening temperature B/50.

2. The process of claim 1, wherein said at least one thermoplastic is a polycarbonate or copolycarbonate based on a diphenol, a poly- or copolyacrylate, a poly- or copolymethacrylate, a poly- or copolymer of styrene, a thermoplastic polyurethane, a polyolefin, a poly- or copolycondensate of terephthalic acid, or mixture thereof.

3. The process of claim 1, wherein said at least one thermoplastic is polycarbonate, and wherein said heating is carried out so that at least one side of the entire said at least one film section or of the predominant part of said at least one film section has a film surface temperature in the range of from 180° C. to 200° C.

4. The process of claim 3, wherein
said flat film piece mounted on said frame is kept in said heating zone for heating over a period of time at a distance from at least one heating field built up from a number of infrared surface heaters which can be activated individually;
on the way from said heating zone to said forming zone said heated flat film piece passes a temperature measurement station wherein the temperature distribution on a surface of said heated flat film is scanned, rendered visible, and/or shown in another manner with the aid of a thermal imaging camera; and
said heating is a differential heating wherein each individual infrared surface heater is activated individually in order to
minimize the temperature differences on the film section which can be seen from the temperature distribution,
heat at least one side of the predominant film section to a film surface temperature in the range of from 180° C. to 200° C., and
optionally heat individual selected film piece segments to a higher temperature which exceeds this film surface temperature by at least 3° C. and by not more than 10° C.

5. The process of claim 3, wherein at least one side of the entire said at least one film section or of the predominant part of said at least one film section is heated to a film surface temperature in the range of from 185° C. to 195° C.

6. The process of claim 1, wherein said at least one thermoplastic is polymethyl methacrylate, and wherein said heating is carried out so that at least one side of the entire said at least one film section or of the predominant part of said at least one film section has a film surface temperature in the range of from 130° C. to 150° C.

7. The process of claim 6, wherein
said flat film piece mounted on said frame is kept in said heating zone for heating over a period of time at a distance from at least one heating field built up from a number of infrared surface heaters which can be activated individually;
on the way from said heating zone to said forming zone said heated flat film piece passes a temperature measurement station wherein the temperature distribution on a surface of said heated flat film is scanned, rendered visible, and/or shown in another manner with the aid of a thermal imaging camera; and
said heating is a differential heating wherein each individual infrared surface heater is activated individually in order to
minimize the temperature differences on the film section which can be seen from the temperature distribution,
heat at least one side of the predominant film section to a film surface temperature in the range of from 130° C. to 150° C., and
optionally heat individual selected film piece segments to a higher temperature which exceeds this film surface temperature by at least 3° C. and by not more than 10° C.

8. The process of claim 4, wherein said selected film piece segments are those in which a higher flexibilizing of the film material is to be achieved.

9. The process of claim 8, wherein said selected film piece segments are those in which a particularly high degree of forming of the originally flat film is to take place or in which an exact casting of sharp-edged contours, an accurately fitting reproduction of particularly finely divided embossings and/or engravings, and a correction of pressure-related deviations in position is to be achieved.

10. The process of claim 4, wherein
a number of thermoformed film parts of the same type are produced; and
the measurement and evaluation of the temperature distribution on a film surface is carried out only during the production of some of all the thermoformed film parts of this type and not carried out during the production of the remaining portion of the thermoformed film parts of this type.

11. The process of claim 1, wherein said heating zone has two horizontally aligned heating fields of the same area arranged parallel at a distance from one another and aligned with one another, wherein, during heating, said flat film piece mounted on said frame is arranged approximately centrally between said two horizontally aligned heating fields and held there for a period of time.

12. The process of claim 1, wherein said heated flat film piece is transferred into said forming zone in less than 5 seconds.

13. The process of claim 1, wherein said heated flat film piece is transferred into said forming zone in less than 2 seconds.

14. The process of claim 1, wherein said flat film piece is transparent.

15. The process of claim 1, wherein said flat film piece is single-layered.

16. The process of claim 1, wherein said flat film piece is multi-layered coextruded film or laminate film of at least two different thermoplastics.

* * * * *